(12) United States Patent
Sinclair

(10) Patent No.: US 6,213,184 B1
(45) Date of Patent: Apr. 10, 2001

(54) SEAM WELDER

(76) Inventor: Frank Sinclair, 6686A Merchandise Way, Diamond Springs, CA (US) 95619

( * ) Notice: Subject to any disclaimer, the term of this patent is extended or adjusted under 35 U.S.C. 154(b) by 0 days.

(21) Appl. No.: 09/241,970

(22) Filed: Feb. 1, 1999

Related U.S. Application Data

(63) Continuation-in-part of application No. 08/861,275, filed on May 21, 1997, now Pat. No. 5,865,942, which is a continuation-in-part of application No. 08/599,937, filed on Feb. 14, 1996, now abandoned.

(51) Int. Cl.[7] .................................................. B32B 35/00
(52) U.S. Cl. ......................... 156/499; 156/544; 156/555; 156/574; 156/579
(58) Field of Search .................................... 156/433, 436, 156/438, 443, 459, 461, 465, 468, 470, 475, 499, 580, 555, 583.1, 157, 502, 544, 574, 579

(56) References Cited

U.S. PATENT DOCUMENTS

| | | | |
|---|---|---|---|
| 3,005,484 | 10/1961 | Kuconis | 156/438 |
| 3,143,456 | 8/1964 | McGrath et al. | 156/438 X |
| 4,087,309 | 5/1978 | Lang | 156/497 |
| 4,146,419 | 3/1979 | Neidhart | 156/391 |
| 4,447,288 | 5/1984 | Seaman | 156/574 |
| 4,744,855 | 5/1988 | Ellenberger et al. | 156/498 |
| 4,769,102 | * 9/1988 | Neumuller et al. | 156/359 |
| 4,834,827 | * 5/1989 | Obeda | 156/352 |
| 4,834,828 | 5/1989 | Murphy | 156/359 |
| 4,855,004 | 8/1989 | Chitjian | 156/359 |
| 4,872,941 | 10/1989 | Lippman et al. | 156/497 |
| 4,913,772 | 4/1990 | Taylor et al. | 156/499 |
| 4,923,558 | 5/1990 | Ellenberger et al. | 156/498 |
| 4,950,352 | 8/1990 | Greller | 156/443 |
| 5,051,148 | 9/1991 | Resch | 156/358 |
| 5,091,038 | 2/1992 | Greller et al. | 156/497 |
| 5,328,545 | 7/1994 | Kaminski | 156/583.1 |
| 5,490,626 | 2/1996 | Kaminski | 228/44.3 |
| 5,865,942 | 2/1999 | Sinclair | 156/499 |

FOREIGN PATENT DOCUMENTS

| | | |
|---|---|---|
| 738367 | 8/1943 | (DE) . |
| 0009015 | 3/1980 | (EP) . |
| 0541931 | 5/1993 | (EP) . |
| 2138739 | 11/1983 | (GB) . |

OTHER PUBLICATIONS

Brochure; PFAFF; Mobile heat–sealing machines; no date.
Brochure; Columbine International, Ltd.; "Wedge–It"; no date.

* cited by examiner

Primary Examiner—James Sells
(74) Attorney, Agent, or Firm—Joseph E. Gerber

(57) ABSTRACT

A hot wedge, automatic seam welder is disclosed. The welder is comprised of a chassis having a base plate, a motor housing and a support arm extending from the motor housing. An S-shaped guide for guiding opposing sheets of material is between the base plate and the motor housing. Disposed downstream from the motor housing, depending from the support arm, is vertically-movable suspension for a driven upper pressure roller which is occludable with a driven lower pressure roller on the base plate. Also depending from the support arm is vertically-movable and adjustable suspension for the hot wedge. A horn-shaped shroud for guiding material over and under the wedge, and for shrouding the wedge when in its disengaged mode, is disposed upstream from the wedge. Guides for performing lap welds, fin welds and hem welds, as well as many variations thereupon, are also disclosed.

11 Claims, 18 Drawing Sheets

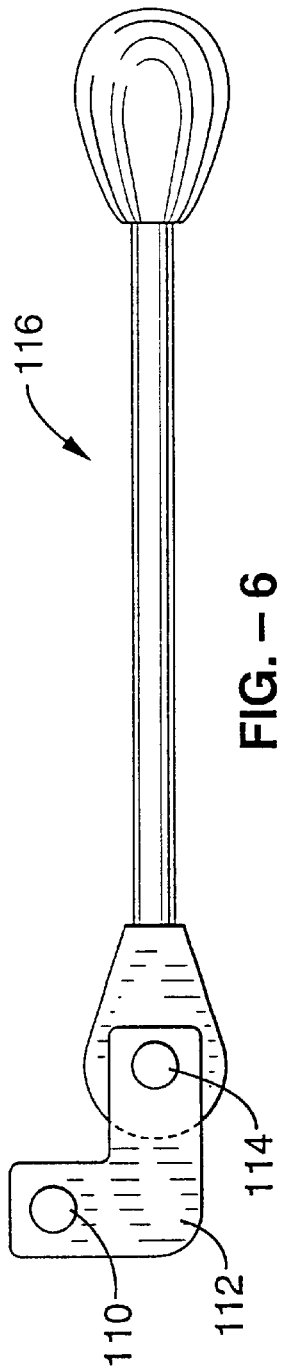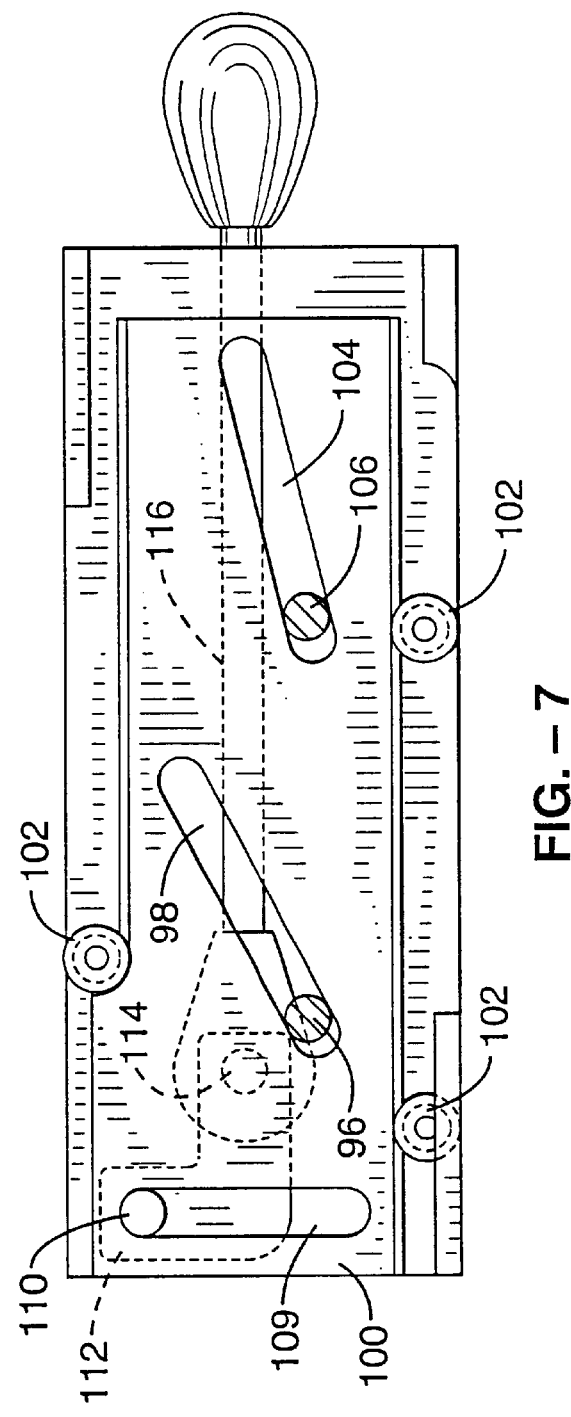

SEAM WELDER

REFERENCE TO RELATED APPLICATION

This is a Continuation-in-part of application Ser. No. 08/861,275, filed May 21, 1997, U.S. Pat. No. 5,865,942, which was a continuation-in-part of application Ser. No. 08/599,937 filed Feb. 14, 1996 abandoned.

BACKGROUND OF THE INVENTION

1. Field of the Invention

The present invention relates generally to apparatus for welding plastics, and more specifically to apparatus for forming seams in sheet materials having weldable plastic components.

2. Description of the Related Art

Apparatus for welding seams in plasticized sheet materials generally include several basic components: infeed guides; a heating element; pressure rollers; and, a drive system for moving either the sheet material or the welder with respect to the other.

Sheets of weldable material are commonly joined to one another with either of two primary seam configurations: the lap weld; or, the fin weld (the fin weld also being known as the "prayer" weld). A third primary seam type, used in binding a sheet's edge to itself, is the hem weld. Variations on, or specific applications of, these three primary seam configurations can be used to create a range of different structures adapted to particular purposes, including; taped reinforcements; taped, butt-welded joints; sleeves; tubes; and, flaps.

However, currently available seam welders are unable to produce all of the three primary seam types, or are otherwise lacking features which would make them equally practical for creating all three types in an industrial setting. For example, U.S. Pat. No. 4,950,352 issued to Greller in 1990 shows a welder with its pressure rollers oriented for unlimited material widths distal to the rollers with respect to the chassis; but, Greller's chosen roller suspension leaves limited space between the rollers and the chassis, making it impractical for use in lap welding very wide sheets of material. Further, Greller's 1990 welder, being a "hot-air" welder, would suffer limitations inherent to that genus, i.e. being useful only for sheet materials of limited thickness, and being generally noisy.

U.S. Pat. No. 4,855,004 issued to Chitjian in 1989 shows a power-driven, hand-guided, hot-air welder adapted for lap welding seams of wide sheets of material on roof decks, and the like. Lap seams are the primary intended product of the Chitjian welder; fin and hem welds appear technically possible, but less practical for the lack of appropriate infeed guides. Further, being hand-guided, drawbacks of the Chitjian welder include the non-uniformity in welds caused by slight drive speed and direction changes, and great dependence upon the skill of the operator, as well as the previously-mentioned problems with hot-air welders.

Ellenberger, et al, in U.S. Pat. No. 4,774,855 issued in 1988 shows another lap-seam welder adapted for hand-guiding over surfaces covered in weldable sheeting. This is a "hot-wedge" welder, employing a wedge-shaped, high-temperature, electrically-powered metal heating element. Hot-wedge welders such as that shown in the Ellenberger, et al 1988 patent are generally more versatile and reliable in their ability to weld materials of different thicknesses. However, the welder of the Ellenberger, et al 1988 patent is limited by its infeed guide structure in the types of welds it can perform; lap welds are primarily provided-for, while fin and hem welds may be technically feasible to a limited, albeit impractical, extent.

Taped reinforcements and taped, butt-welded joints are the product of the radiant-heat, tape welder disclosed in U.S. Pat. No. 4,913,772 issued to Taylor, et al in 1990. These are lap weld variants are difficult to perform with some other welders. However, the welder of Taylor, et al lacks the infeed guide structure to permit welds of the other primary types.

Greller, et al, in U.S. Pat. No. 5,091,038 issued in 1992, discloses a hot wedge welder with guides for performing lap and hem welds, and fin welds also appear possible. The Greller 1992 welder is "automatic," i.e. self-propelled, and can therefore be run along a sheet's edge under its own power at a precise speed for an accurate and consistent weld. However, the limitations of the chassis construction, and especially the dimension of the arm upon which the hot wedge is mounted on the Greller, et al 1992 apparatus, make lap welding therewith cumbersome, and practical in only limited applications. Specifically, only when both sheets to be lap welded can be laid out distal to the rollers and chassis can extremely wide sheets be lap welded together, because the space between the rollers and chassis is limited. Thus, the Greller 1992 welder cannot be used for lap welding or taped butt-welding wide sheets laid out on a roof deck, for example. Further, Greller, et al's 1992 apparatus appears to be exceedingly dangerous in that its hot wedge, which operates at temperatures of 1000° F., or more, is not shielded to protect an operator from severe burns; and yet further, it projects menacingly from the apparatus when swung away from its welding position.

European Patent Application No. 79890022.1 filed by Winkler, et al in 1979 discloses a hot wedge welder illustrated as being capable of lap and fin welds, and which may have limited hem welding capability. The Winkler, et al welder employs an S-shaped chassis upon which opposed pressure rollers appear able to be mounted on either horizontal or vertical axes for either lap or fin welding, respectively. However, switching between roller orientations appears cumbersome, and would make precise centering of the hot wedge in the plane tangent to the point of roller occlusion difficult, wedge centering being quite important to the quality of the weld.

Regarding hem welds specifically, although several of the aforementioned devices are able to produce a hem, most leave a gap or channel therein which remains nonbonded. That is, the portion of the hem weld closest to the creased fold of the hem fails to be sealed completely. This can result from the failure of the welding apparatus to heat that portion of the weldable sheet material closest to the creased fold; or, even if the apparatus heats that portion of the material, rollers or other apparatus for pressing the entirety of the hem together may not be provided. This is commonly the problem when the welder is configured to permit a cord, rope, chain or cable to be bound into a hem channel. In that case, the portion of the hem through which the cord, rope, chain or cable runs is not fed through the nip of the rollers which press the rest of the hem together.

Thus, when just a flat hem is needed, as when fabricating banners, flags, covers, and other products where grommets are used, such devices do not have the ability to produce a gapless hem.

Thus, it appears a need exists for a safe and reliable seam welder able to construct lap, fin and hem welds, as well as taped reinforcements, taped butt-welded joints, sleeves, tubes, gapless flat hems, and, flaps, while being minimally limited in the thickness of material it can weld. And, complexity and imprecision in switching among these different weld-types should be minimized, as well. Further, an ideal welder would be able to perform lap and taped butt-welds without limitations on the width of either sheet being welded. Yet further, accurate wedge centering to assure uniform heating of the sheets being welded would be desirable, as would precise speed control to assure that the weld is consistent along its length. And, means for producing a fully-bonded, gap-free, flat hem would also be provided.

SUMMARY OF THE INVENTION

The seam welder of the present invention is adapted to overcome the above-noted shortcomings and to fulfill the stated needs. It is comprised of a chassis having an upstream end and an opposing downstream end; means for moving weldable sheet material therethrough; open-sided infeed guides for feeding first and second sheets of unlimited width into the welder in first and second planes, respectively; means downstream from the guides for welding overlapping portions of the sheets to one another, wherein the welding means includes opposed first and second welding surfaces and opposed first and second ends, and wherein the welding means is suspended by its first end from suspension connected to the chassis; means for guiding the first and second sheet portions past the first and second welding surfaces, respectively, of the welding means; and, means downstream from the welding means for bringing opposed surfaces of the first and second sheet portions into contact with one another.

Further included are means for accurate centering of the welding means with respect to the means for bringing the sheets' opposed surfaces into contact with one another.

Yet further included are means for producing a gapless flat hem weld, comprising all of the elements of the seam welder, above, and further comprising means for pressing a portion of the weldable sheet material passing the hot wedge against an exposed side face of the hot wedge. Also included are means wider than the hot wedge for forming a creased, upstream to downstream, fold in that portion of the sheet material that has passed and been heated by the exposed side face of the hot wedge.

The flat hem-producing apparatus further includes means for pressing together heated portions of the material, including those portions directly adjacent the creased fold, into a flat hem.

Thus, it is an object of the present invention to provide a seam welder which is versatile in the types of welds it can perform, and unlimited in the sizes of the sheets it can join together.

It is a further object of the present invention to provide a seam welder which is exceedingly easy to use and able to produce accurate, consistent results along the length of the weld, as well as from one weld to the next.

Yet another object of the invention is to provide a hot wedge seam welder which is exceedingly safe to use, such that its hot wedge is shielded from operator contact when in its engaged, working position, as well as in its retracted, idle position.

And, an additional object of the invention is to provide a hot wedge seam welder able to produce fully-bonded flat hem welds without gaps or channels therein.

Still further objects of the inventive seam welder disclosed herein will be apparent from the drawings and following detailed description thereof.

BRIEF DESCRIPTION OF THE DRAWINGS

FIG. 6 is a side elevation of the drop handle which raises and lowers the hot wedge and upper pressure roller.

FIG. 7 is a partly disassembled, isolated perspective view from the top right downstream side of the welder, of the cam plate and its mounting for sliding motion.

DESCRIPTION OF THE PREFERRED EMBODIMENT

Figure 1:
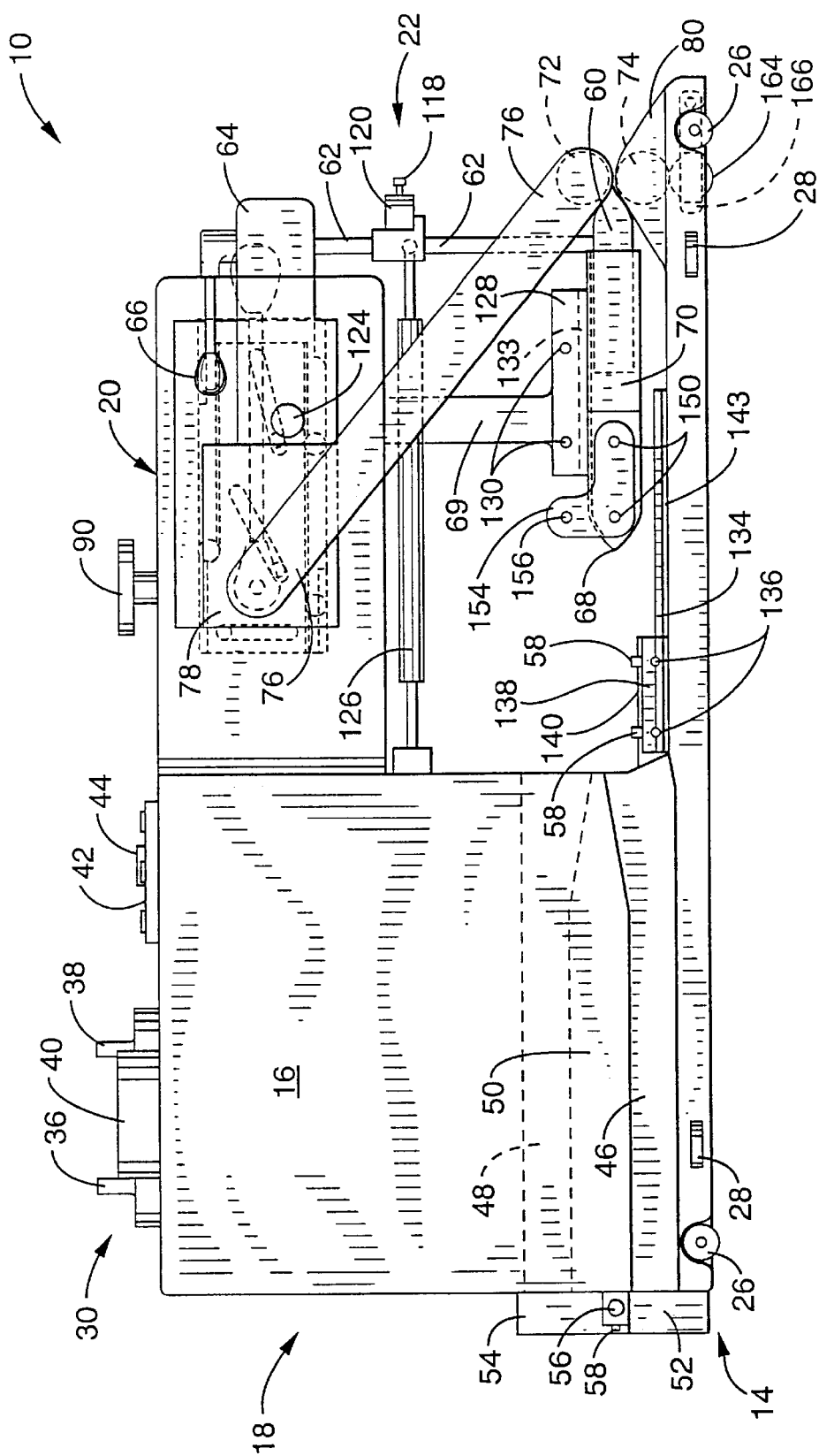
FIG. 1 is a right front perspective view of the seam welder of the invention.
Figure 2:
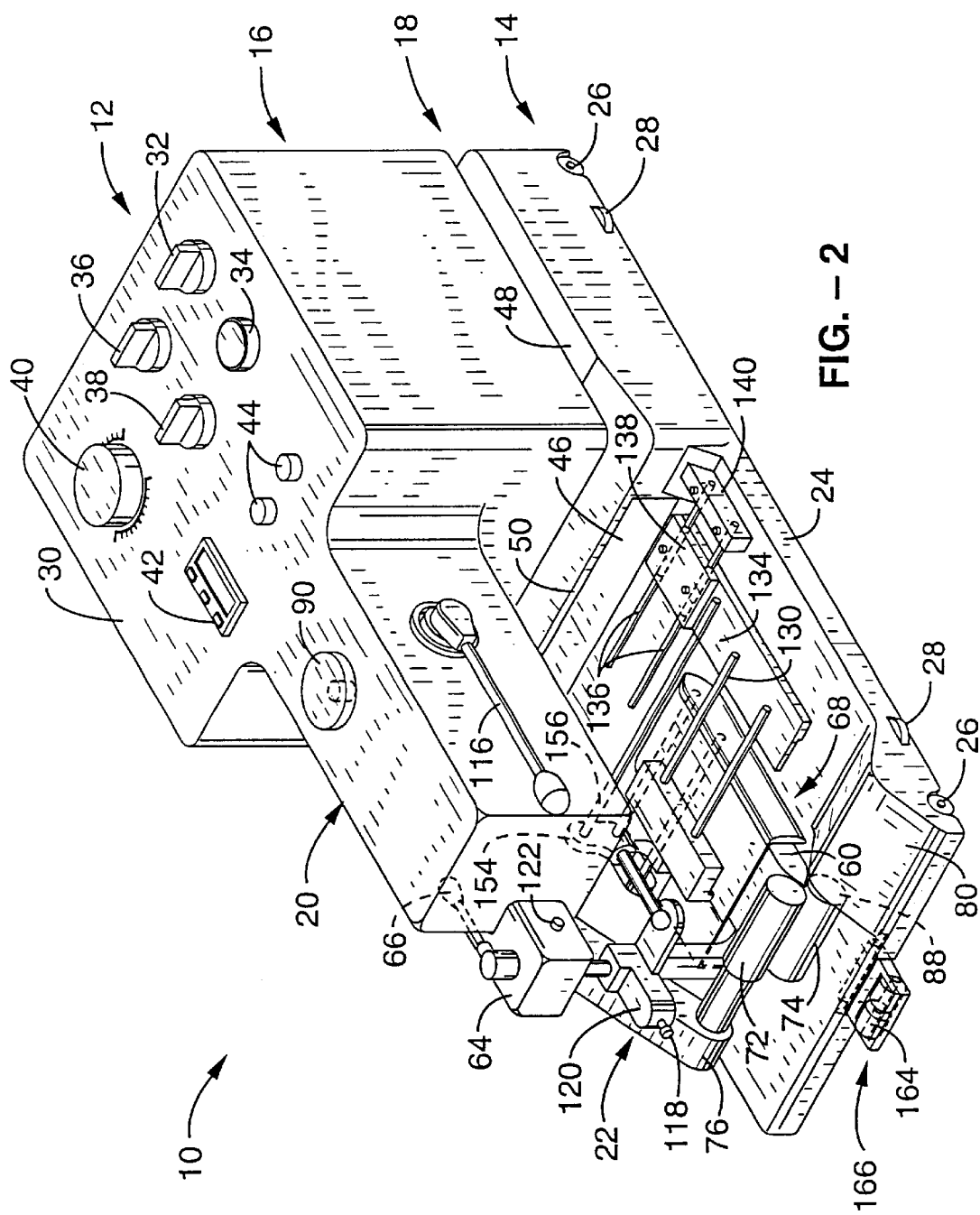
FIG. 2 is a rear left perspective view of the seam welder of FIG. 1, showing its edge guides, horn, welding head (hot wedge) and pressure rollers.

Referring now specifically to the drawings, FIGS. 1 and 2 show the inventive seam welder, which is generally identified herein with the reference numeral 10. Seam welder 10, in its gross configuration, is comprised of a chassis 12, with drive and welding elements supported thereupon.

Chassis 12 includes lower base portion 14; upper motor housing portion 16; S-shaped infeed portion 18 therebetween; and, projecting support arm portion 20. An outfeed portion 22 of welder 10 including drive and welding elements is disposed in the space between support arm portion 20's distal end and base portion 14.

Infeed portion 18 and outfeed portion 22 are oriented at the upstream and downstream ends, respectively, of welder 10. Support arm 20 projects in a downstream projection from motor housing portion 16 in the upper portion of chassis 12.

Base portion 14 includes base plate 24, wheels 26 and side bearings 28, as well as other elements described herein below.

Motor housing 16 is generally rectangular in configuration, and its upper surface includes control panel 30. Control panel 30 includes on/off switch 32; power indicator light 34; manual/auto switch 36; forward/reverse switch 38; speed control switch 40; programmable temperature control 42; and, fuses 44.

Figure 3:
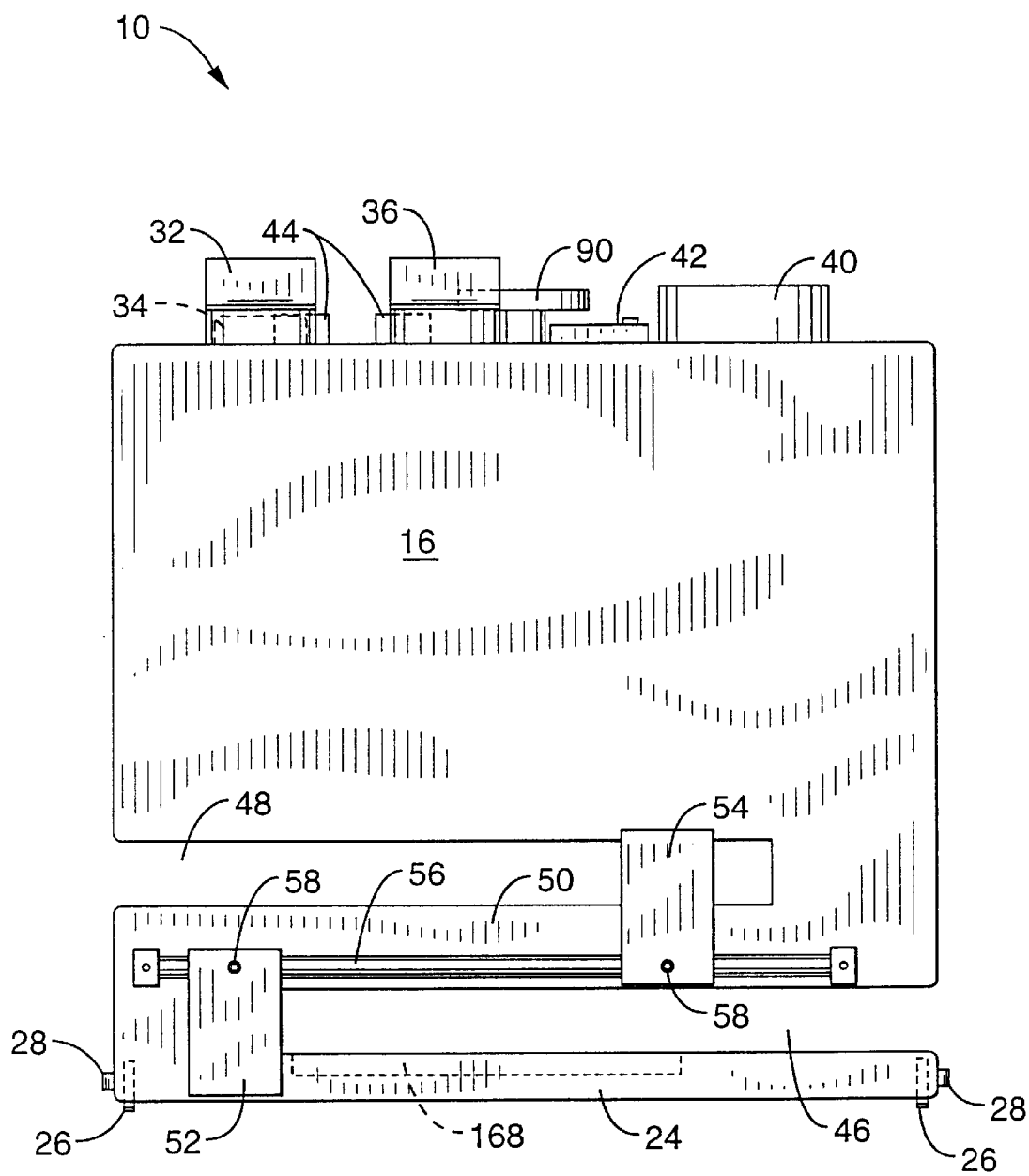
FIG. 3 is a front elevation of the welder of FIG. 1, showing its infeed slots, divider plate and sliding guides.

FIG. 3 shows that S-shaped infeed portion 18 includes lower right slot 46 and upper left slot 48, with rigid divider plate 50 therebetween. Right slot 46 is open on the right side of welder 10, as welder 10 is viewed from its upstream side as in FIG. 3, and left slot 48 is open on welder 10's left side. Lower right slot 46 is closed on its left side, and upper left slot 48 is closed on its right side.

The right and left directional orientations established with respect to right and left slots 46 and 48 will be carried through the remainder of the following disclosure in describing the locations and orientations of welder 10's other elements. That is, right and left are determined from an upstream position, looking in a downstream direction.

Plate 50 is contiguous, on its left side, with lower right slot 46's closed end, therebelow; and, plate 50 is contiguous, on its right side, with upper left slot 48's closed end, thereabove. Plate 50 is somewhat thicker at its upstream end than at its downstream end, for a reason to be discussed further herein below.

Right and left slots 46 and 48 have right and left slot sliding guides 52 and 54, respectively, which are both disposed on guide support rail 56. Rail 56 is in the plane of divider plate 50. Slot guides 52 and 54 include guide lock screws 58 which permit them to be fixed at any position in their travel along guide support rail 56. Slot guides 52 and 54 may be placed to limit the inner extent, and thereby the effective width, of slots 46 and 48 with reference to the sides of chassis 12, but slot guides 52 and 54 are not intended to define the outer width limits of these slots.

Downstream from infeed portion 18, and beneath support arm 20, are the welding elements of welder 10. The primary welding element, or welding head, is hot wedge 60 which is machined from aluminum to be elongate with a generally triangular cross-section. Wedge 60 includes one or more heating elements therewithin, powered via flexible electrical leads (not shown) connected to welder 10's power supply. Wedge 60 has the apex of its triangular cross-section oriented downstream, and is supported from its right-hand side by suspension which includes vertical shaft 62 mounted in, and passing through, wedge support housing 64. Atop wedge support housing 64, the upper end of vertical shaft 62 is fitted with wedge engaging handle 66, appropriate support bearings being provided between housing 64 and shaft 62. Wedge engaging handle 66 swings through a horizontal arc, and as it does, hot wedge 60 does the same at shaft 62's lower end.

Immediately upstream from hot wedge 60 is a hollow, protective shroud commonly referred to as a "horn." Horn 68 is generally wedge-shaped, having its apex oriented in an upstream direction. Horn 68 is suspended from its right side on the lower end of shroud support leg 69, which is comprised of a rigid vertical member upstream of vertical shaft 62, depending from hot wedge support housing 64. Horn 68's right side opens into hollow, generally rectangular, hot wedge parking shroud 70, which is also mounted on the lower end of shroud support leg 69.

At one extent of its horizontal arc, when wedge engaging handle 66 is thrown toward a position where it is aligned with welder 10's upstream/downstream axis as in FIG. 1, hot wedge 60 is in its engaged position wherein its length, and so its apex, are generally perpendicular to welder 10's upstream/downstream axis. At the other extent of its horizontal arc, when wedge engaging handle 66 is thrown toward its downstream-most position, hot wedge 60 is drawn toward the right side of welder 10, through horn 68 and into parking shroud 70, where wedge 60 rests in its disengaged position with its length aligned with welder 10's upstream/downstream axis.

Figure 4:
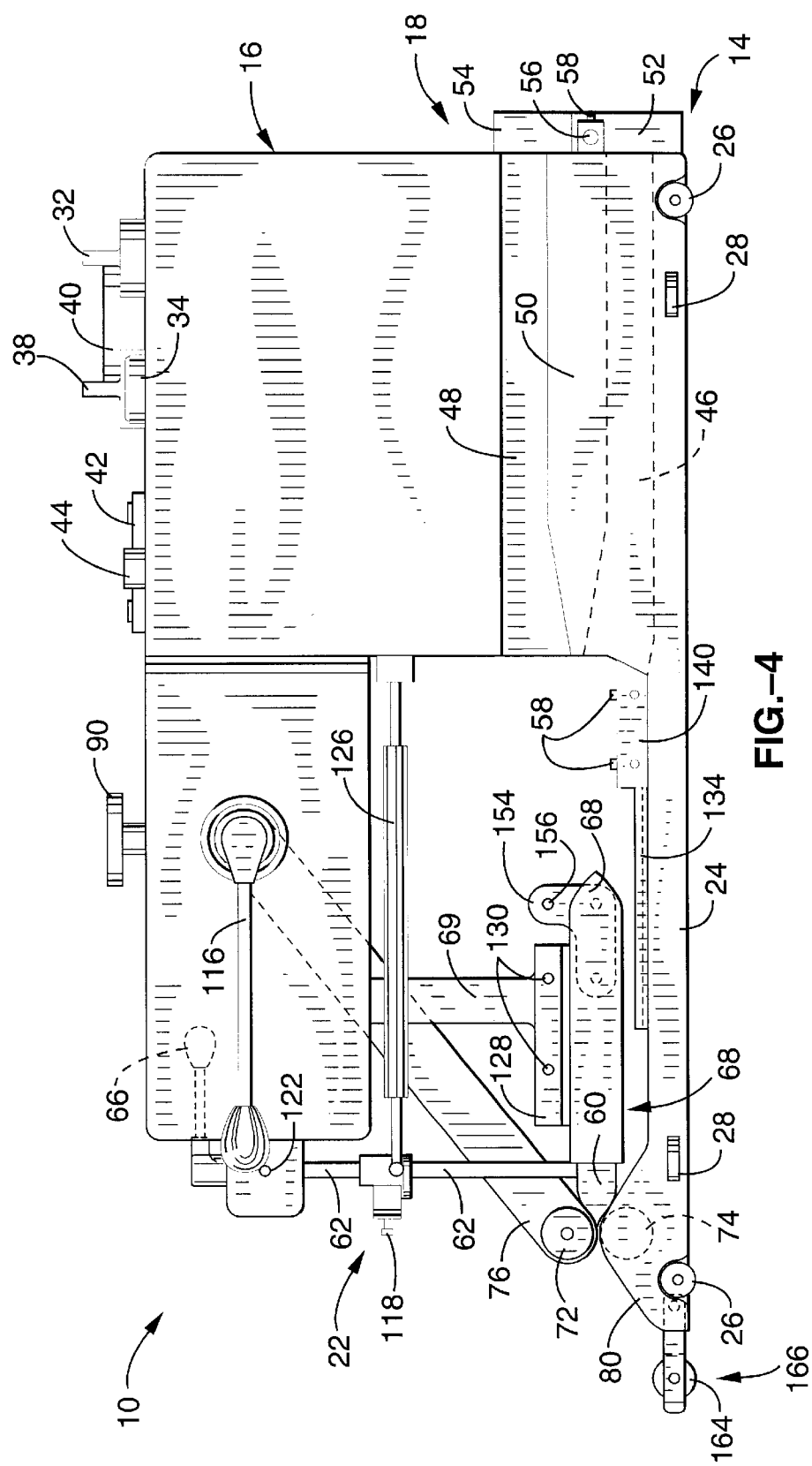
FIG. 4 is a left side elevation of the outfeed portion of the welder, showing the orientation of the hot wedge in its engaged position against the upstream side of the top and bottom pressure rollers.
Figure 5:
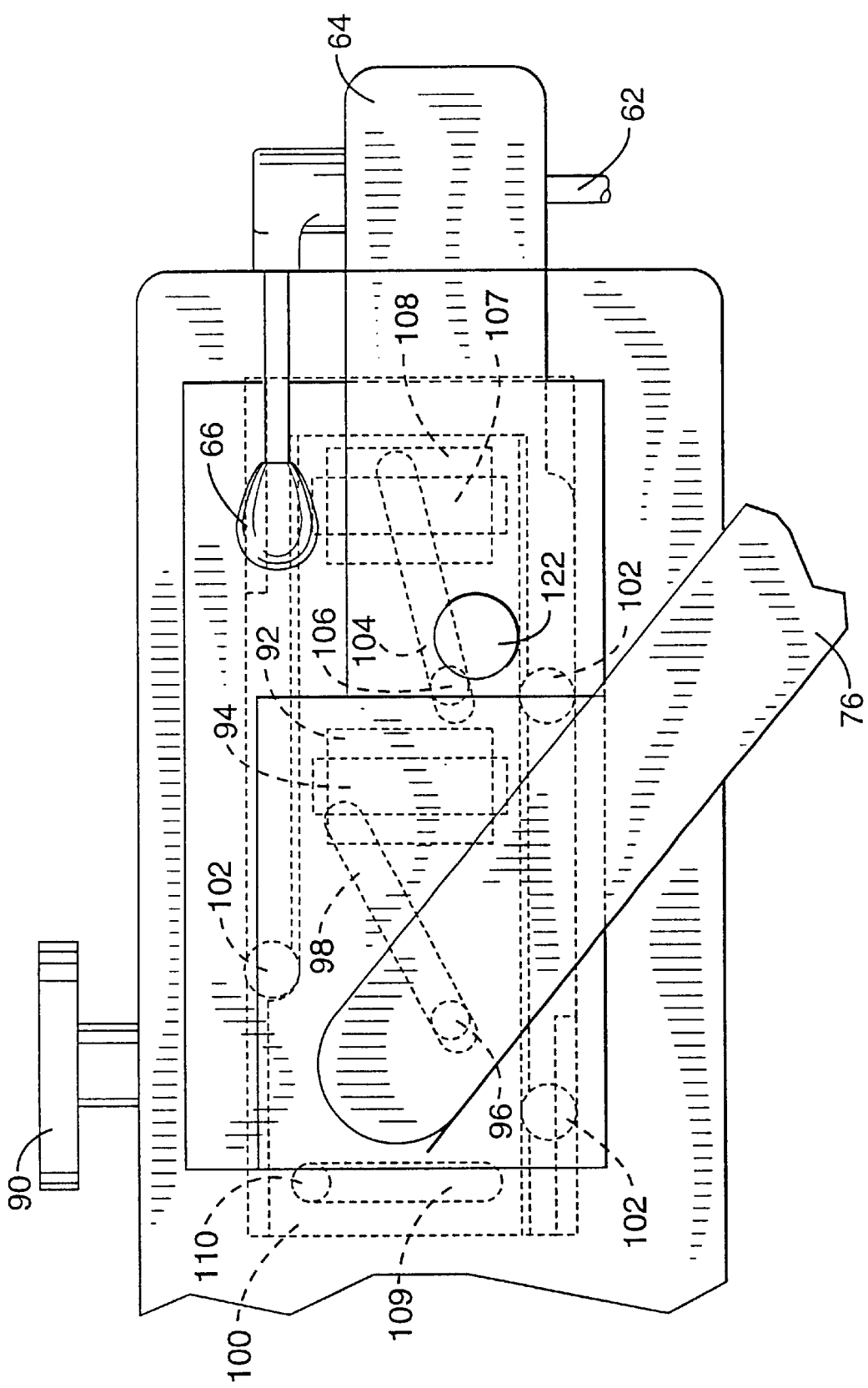
FIG. 5 is a partly disassembled perspective view from the top right downstream side of the welder's support arm, with its cover off, showing the upper roller housing and the hot wedge support housing, as well as their respective sliders, and their positions with reference to the cam plate.

As shown in FIGS. 2, 4 and 5, directly downstream from hot wedge 60's engaged position are upper and lower pressure rollers 72 and 74, respectively. Rollers 72 and 74 are of a dense, resilient construction, and rotate on spindles oriented on parallel, horizontal axes. Upper pressure roller 72 is suspended from the right and projects perpendicularly from the lower end of upper roller drive chain conduit 76 which, in turn, is elongate and angularly disposed, and has its upper terminus at upper roller drive housing 78 upstream of hot wedge support housing 64. Upper roller drive chain conduit 76 covers a drive chain (not shown).

Lower roller 74 projects from the left, from lower roller drive shaft channel 80. Lower roller 74 is driven by a drive shaft (not shown), which is powered by sprocket, shaft and chain elements (not shown) running in channels through the upstream edge of divider plate 50 and along the left side of base plate 24.

Upper and lower rollers 72 and 74 are driven at the same rotational speed by chain and sprocket links to an electric motor (not shown) within motor housing 16.

The free, right-hand end face 82 of lower roller 74 resides in the same plane as the inner, right-hand, drive side face 84 of upper roller 72. Likewise, the free, left-hand end face 86 of upper roller 72 resides in the same plane as the inner, left-hand, drive side face 88 of lower roller 74.

The pressure exerted by upper roller 72 against lower roller 74 can be adjusted by rotation of knurled upper roller pressure adjustment knob 90. A vertically oriented coil spring therebeneath (not shown) exerts pressure between the upper inside of support arm 20 and a slider 92 with which upper roller drive housing 78 is engaged.

Upper roller housing slider 92, shown in FIG. 5, is mounted for bearing-aided, reciprocal, vertical movement on vertical track 94. Upper roller drive housing 78 has a projecting cylindrical cam follower 96 on its left side, which engages an approximately 28° angled slot 98 in cam plate 100. Cam plate 100 is generally rectangular and is mounted on bearings 102 for low-friction, reciprocal, horizontal motion.

Cam plate 100 also includes an approximately 14° angled slot 104, which is downstream from 28° angled slot 96. Second cam follower 106 projects from the left side of hot wedge support housing 64 and engages 14° angled slot 98. Hot wedge support housing slider 108 is mounted for bearing-aided, reciprocal, vertical movement on vertical track 107.

Cam plate 98 also includes vertical slot 109 adjacent its upstream end. Slot 109 accommodates third cam follower 110 which is mounted on tab 112 eccentric to pivot shaft 114 of drop handle 116. Drop handle 116 is mounted to the outer left side of support arm 20.

When drop handle 116 is thrown into a vertical orientation, third cam follower 110 moves in an upstream direction and, consequently, toward the lower end of vertical slot 109. This causes cam plate 98 to be driven toward its upstream-most position; and, as that occurs, first and second cam followers 96 and 106, respectively, naturally rise higher in their respective angled slots, 98 and 104. Upward movement of first cam follower 96 causes upper roller housing slider 92, upper roller drive housing 78, upper roller drive chain conduit 76 and upper pressure roller 72 all to rise. Upward movement of second cam follower 106 causes hot wedge support housing slider 108, hot wedge support housing 64, wedge engaging handle 66, vertical shaft 62, hot wedge 60, shroud support leg 69, horn 68 and hot wedge parking shroud 70 all to rise, along with various auxiliary material guides further described below.

When drop handle 116 is released from the below-described detent at the upward extent of its travel and thrown downward, in a downstream direction, into a horizontal orientation as shown in FIG. 2, thereby driving cam plate 98 toward its downstream-most position, first and second cam followers 96 and 106, respectively, drop lower in their slots, and all of the elements described herein above as being respectively associated therewith, drop down into their engaged, welding positions.

Owing to the approximately 28° angle of angled slot 98 and the approximately 14° angle of angled slot 104, the ratio of the vertical distance upper roller 72 moves to the vertical distance hot wedge 60 moves, with the passage of drop handle 116 through a given arc, is always 2:1. However, the particular angles disclosed as preferred are not critical to the function of welder 10; indeed, satisfactory function is expected to be achieved over a wide range of angles. But, it is important that the ratio of the angle of angled slot 98 to the angle of angled slot 104 always be 2:1. This causes upper pressure roller 72 always to travel twice the vertical distance traveled by wedge 60.

Upper roller drive housing 78 rises against the resistance force of the vertically oriented coil spring (not shown) associated with upper roller pressure adjustment knob 90. However, third cam follower 110 on lobe 112 of drop handle 116 is positioned a sufficient distance from pivot shaft 114's axis, and vertical slot 109's terminus is sufficiently low on cam plate 98, that when handle 116 is vertical, cam follower 110 is in an over-center position with respect to pivot shaft 114 and the force being applied by the vertical coil spring. Thus, a detent in the operation of drop handle 116 is provided in the "up" position. And, this detent permits all upper roller-associated elements, as well as all hot wedge-associated elements to rest securely in this up, disengaged position.

Hot wedge 60, when in its engaged position, is ideally aligned with respect to upper and lower rollers 72 and 74 such that wedge 60's length is parallel to the line along which the surfaces of rollers 72 and 74 occlude. This line of occlusion is generally perpendicular to welder 10's upstream/downstream axis, and is commonly referred to as the "nip" of the rollers. Wedge right end/left end adjustment screw 118, on alignment adjustment block 120, permits such parallel alignment of the wedge to the nip by moving the right end of hot wedge 60, where it is attached to the lower end of vertical shaft 62, slightly off-center in either an upstream or a downstream direction with respect to shaft 62's vertical axis, as desired. Thus, adjustment screw 118 permits selective movement of either the right end or the left end of wedge 60 upstream or downstream in the horizontal plane, so that either one end or the other is closer to, or farther away from, the nip.

Nip proximity adjustment screw 122 on wedge support housing 64 provides direct upstream and downstream adjustment of the entire length of wedge 60, permitting wedge 60 to be brought closer to, or farther away from, the nip of rollers 72 and 74, without altering wedge 60's parallel adjustment thereto.

And, wedge 60, when in its engaged position, is ideally positioned with respect to upper and lower rollers 72 and 74 such that wedge 60's apex is centered in the plane tangent to the surfaces of both rollers along the line where they occlude, i.e. neither above nor below the horizontal plane running through the nip. Wedge vertical adjustment screw 124, on the upstream, right side of wedge support housing 64 provides this.

Once properly adjusted, the 2:1 relationship between the movement distance of upper roller 72 and that of wedge 60 causes wedge 60 to be self-centering between rollers 72 and 74 for all positions of drop handle 116 throughout its arc. Thus, when drop handle 116 is in its up position and rollers 72 and 74 are separated, the space for inserting a sheet of weldable material between the upper face of wedge 60 and roller 72 is the same size as the space between the lower face of wedge 60 and roller 74. And, consequently, when drop handle 116 is lowered into its horizontal position, both sheets of material are pressed against wedge 60 with equal force, thus insuring equal heating and a uniform weld.

It is desirable that hot wedge 60, when placed in its engaged position, have force behind it in a downstream direction, pressing its apex into the nip of rollers 72 and 74, thus assuring good contact and effective heating of weldable material running thereover. It is also desirable that when hot wedge 60 is placed in its disengaged position, retracted into parking shroud 70, that it be positively retained therewithin. Gas cylinder 126 provides means for holding hot wedge 60 in both positions. Its upstream, cylinder end is pivotally mounted on the downstream side of motor housing 16, just under support arm 20. Cylinder 126's downstream, shaft end is pivotally mounted on wedge alignment adjustment block 120 such that when wedge 60 is thrown into its engaged position and adjustment block 120 is oriented downstream, cylinder 126 exerts the desired constant downstream force on wedge 60, pressing it into the nip of rollers 72 and 74. Further, gas cylinder 126's shaft end at adjustment block 120 is mounted in an over-center position, so that when hot wedge 60 is retracted into parking shroud 70, it is retained therein under a positive force.

Welder 10 is capable of performing a variety of welds, including the three primary types: lap, fin and hem welds; and, is further capable of producing several variations thereupon, including: taped reinforcements, taped butt-welded joints, sleeves, tubes, and, flaps. Precise seam construction requires that the weldable sheet material being used be very accurately positioned as it is fed into welder 10's upstream infeed slots 46 and 48, over and under horn 68 and wedge 60, and through pressure rollers 72 and 74. Thus, it is highly desirable that, especially when welder 10 is being used in its self-propelled "automatic" mode, one or more auxiliary guides be used to align the incoming sheet material and to hold it in the proper configuration as it is being drawn across the wedge and welded.

Figure 8:
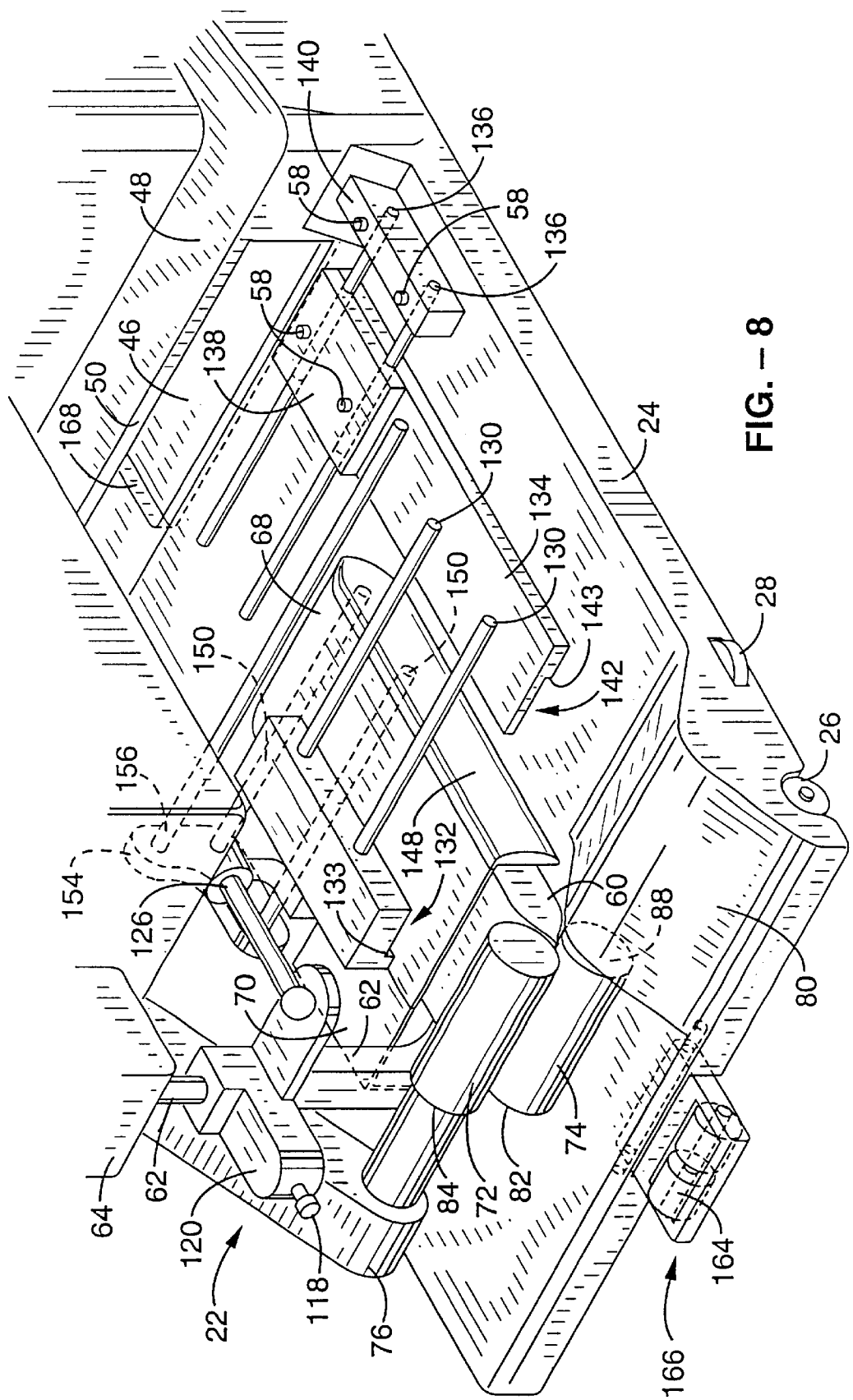
FIG. 8 is a partly disassembled perspective view from the top left downstream side of the outfeed portion of the welder, showing the top right edge auxiliary guide and the bottom left edge auxiliary guide in place for lap welding.
Figure 9:
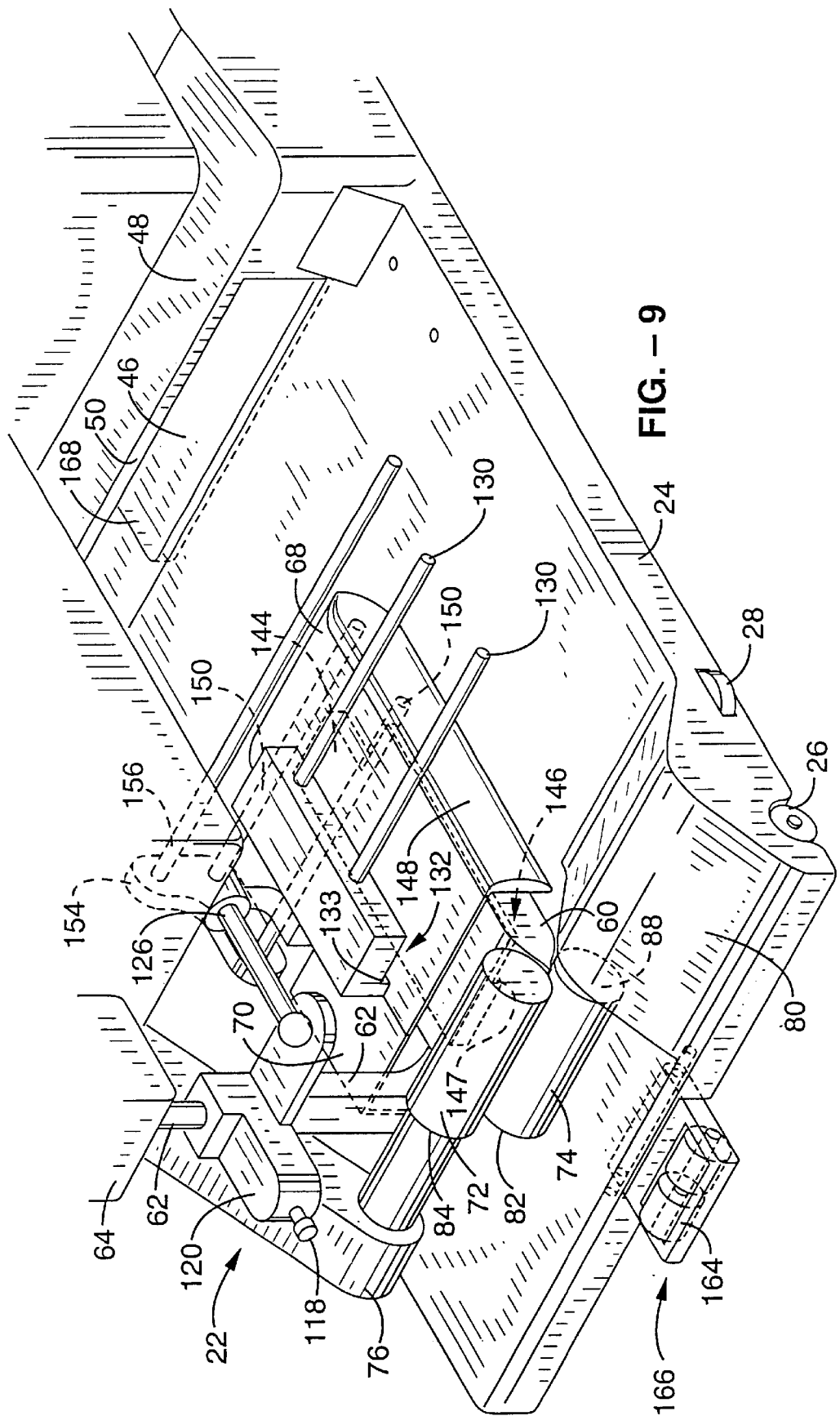
FIG. 9 is a perspective view similar to FIG. 8, showing the bottom right edge auxiliary guide replacing the bottom left edge auxiliary guide, as is required for fin welding.

Top right edge auxiliary guide 128 is elongate and generally rectangular, and resides just above horn 68. And, as shown in FIGS. 8 and 9, its length is oriented parallel to welder 10's upstream/downstream axis. Top right edge auxiliary guide 128 is supported by, and slides on, two top guide support rods 130. Top guide support rods 130 are horizontally oriented, and their right side ends are securely affixed to shroud support leg 69, just above horn 68. Top right edge auxiliary guide 128 is able to slide left and right on top guide support rods 130, and guide lock screws 58 permit guide 128 to be locked in any position therealong.

Top right edge auxiliary guide 128 includes a wide notch 132 along the entire length of its lower face. Notch 132 is open on the left, has a rightward travel-limiting wall 133 on the right which, when guide 128 is moved to its rightward-most limit, preferably aligns with the inner, right-hand, drive side face 84 of upper roller 72. The horizontal underface of notch 132's interior is sufficiently spaced from the upper surface of horn 68 to accommodate the thickest weldable sheet material for which welder 10 is intended to be used. Thus, notch 132 is adapted to receive and limit the rightward travel of the right edge of a weldable material sheet passing from upper left infeed slot 48 of welder 10's infeed portion 18, over horn 68 and hot wedge 60, and through rollers 72 and 74.

As shown in FIG. 8, bottom left edge auxiliary guide 134 is elongate and generally rectangular, and resides just below horn 68. Guide 134's length is oriented parallel to welder 10's upstream/downstream axis. Bottom left edge auxiliary guide 134 slides left and right on base plate 24, along bottom guide rods 136 extending through transverse, horizontal channels in a thickened, upstream portion 138 of guide 134. Guide 134 is able to be fixed in place with guide lock screw 58 which bears against base plate 24. Bottom guide rods 136 are horizontally oriented and securely affixed at their right side ends to removable tab 140 which projects upward from base plate 24 just downstream of, and just left of the left-most terminus of, lower right infeed slot 46. Guide lock screws 58 engage threaded holes in base plate 24 to fix tab 140 in place, when desired.

Bottom left edge auxiliary guide 134 includes a wide notch 142 along the entire length of its lower face. Notch 142 is open on the right and has a leftward travel-limiting wall 143 on the left. The horizontal underface of notch 142's interior is sufficiently spaced from base plate 24 to accommodate the thickest weldable sheet material for which welder 10 is intended to be used. Thus, notch 142 is adapted to receive and limit the leftward travel of the left edge of a weldable material sheet passing from lower right infeed slot 46 of welder 10's infeed portion 18, under horn 68 and hot wedge 60, and through rollers 72 and 74.

FIG. 9, in comparison with FIG. 8, shows bottom left edge auxiliary guide 134 removed and replaced with bottom right edge auxiliary guide 144. Bottom right edge auxiliary guide 144 is generally rectangular in configuration and seats on base plate 24 beneath, and to the right of, hot wedge 60 and horn 68. Guide 144 is not mounted on support rods for sliding adjustment; it is simply adapted to be fastened in a stationary position to base plate 24 with guide lock screw 58.

Guide 144 includes a wide notch 146 along the entire length of its lower face. Notch 146 is open on the left and has a rightward travel-limiting wall 147 on the right. The horizontal underface of notch 146's interior is sufficiently spaced from base plate 24 to accommodate the thickest weldable sheet material for which welder 10 is intended to be used. Thus, notch 146 is adapted to receive and limit the rightward travel of the right edge of a weldable material sheet passing from upper left infeed slot 48 of welder 10's infeed portion 18, under horn 68 and hot wedge 60, and through rollers 72 and 74.

Figure 10:
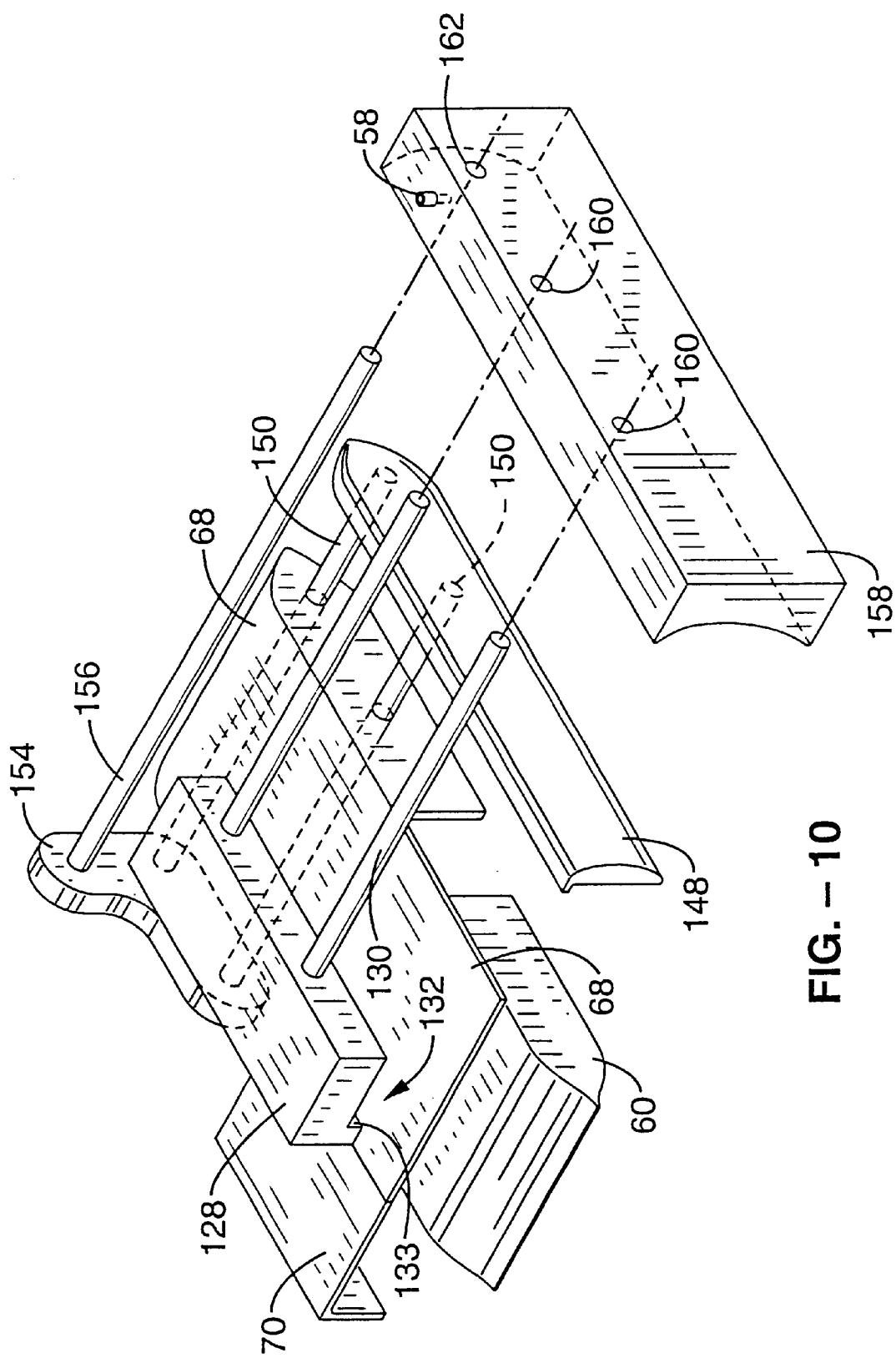
FIG. 10 is a partly disassembled perspective view from the top left downstream side of the outfeed portion of the welder, showing the hem width extender and outer hem guide for hem welding.

Referring now to FIG. 10, horn width extender 148 is comprised of a panel nested against the left face of horn 68, and is extendable to the left on horn width extender support rods 150 to increase horn 68's effective width. Horn width extender 148, when viewed in its side elevation, is shaped to match the side elevation of horn 68; thus, they have generally the same shape in longitudinal cross-section. Horn width extender 148 also preferably has a slightly convex left face.

Horn width extender support rods 150 are horizontally oriented and disposed perpendicular to welder 10's upstream/downstream axis, their left ends being securely bound to the right face of horn width extender 148. Support rods 150 pass slidingly through transverse, horizontal channels in partial side skirt 152 depending from the upstream two-thirds of the left side of horn 68. The right ends of horn width extender support rods 150 are securely bound to the left face of triangular push/pull tab 154, which is disposed to the right of horn 68. Moving push/pull tab 154 to the rightward-most limit of its travel causes horn width extender 148 to rest flush against side skirt 152. Moving push/pull tab 154 leftward causes horn width extender 148 to move a corresponding distance to the left, with tab 154 acting as a stop when it abuts horn 68's right side.

A third rod projecting from the left face of push/pull tab 154 is outer hem guide control rod 156. Outer hem guide control rod 156 is securely bound at its right end to the upper apex of push/pull tab 154, and is oriented parallel to the two lower-situated horn width extender support rods 150.

Further, control rod 156 is disposed in the same horizontal plane as, and somewhat upstream of, top guide support rods 130.

The left end of outer hem guide control rod 156 is intended and adapted for selective attachment to auxiliary outer hem guide 158, which is an elongate bar of approximately the same upstream/downstream length as horn 68. Outer hem guide 158 is generally rectangular in transverse cross-section, but the lower portion of its right face is preferably slightly concave and complementary to the convex left face of horn width extender 148. Three transverse, horizontal channels are disposed along the length of outer hem guide 158, and nearer its upper side, i.e. above its horizontal centerline. The two downstream-most channels 160 are spaced and positioned for sliding receipt of top guide support rods 130. The upstream-most channel 162 is for receipt of the left end of outer hem guide control rod 156, and a guide lock screw 58 is provided above that channel for securing outer hem guide 158 at any point desired along rod 156. Once outer hem guide 158 is secured to rod 156 a fixed distance from horn width extender 148, supported on top guide support rods 130, left or right movement of push/pull tab 154 causes corresponding movement in both horn width extender 148 and outer hem guide 158, without changing the fixed distance between extender 148 and guide 158.

Drive motion for linear translocation of welder 10 and for automatic welding is provided by drive rollers 164 suspended on the end of swing arm 166 which is, in turn, pivotally mounted central to the downstream edge of base plate 24. As shown in FIG. 4, when swing arm 166 is retracted beneath base plate 24, drive rollers 164 are in contact with lower pressure roller 74 and rotational motion is transmitted thereto, pushing welder 10 along in an upstream direction. As drive rollers 164 are of a diameter which also puts them in contact with the supporting surface beneath wheels 26, the rotational motion transmitted from roller 74 effects linear motion of welder 10. Swing arm 166 may alternatively be pivoted to a disengaged position downstream of the rear edge of base plate 24, placing drive rollers 164 out of contact with pressure roller 74 as shown in FIG. 2. In this mode, linear translocation of welder 10 may only be effected by the powered feed of weldable material through rollers 72 and 74, providing such material is otherwise held stationary against movement in relation to the underlying surface.

In use, for example in performing a lap weld, welder 10 is prepared by putting bottom left edge auxiliary guide 134 in place below horn 68. Then, right and left slot sliding infeed guides 52 and 54 are adjusted for the appropriate overlap to achieve the width of weld desired, and top right edge and bottom left edge auxiliary guides 128 and 134 are adjusted for the same amount of overlap. Next, with drop handle 116 in its up position, a first sheet of weldable material 210 is fed into lower right infeed slot 46 and a second sheet 212 is fed into upper left infeed slot 48. Lower sheet 210 is threaded below horn 68, with its left edge against bottom left edge auxiliary guide 134's leftward travel-limiting wall 143, across the lower face of wedge 60 and between rollers 72 and 74. Upper sheet 212 is threaded over horn 68 with its right edge against top right edge auxiliary guide 128's rightward travel-limiting wall 133, across the upper face of wedge 60 and over first sheet 210 between rollers 72 and 74. Then, after lowering drop handle 116 to press upper roller 72 downward against sheets 210 and 212 upon lower roller 74, the downward pressure exerted by upper roller 72 may be set by manipulation of upper roller pressure adjustment knob 90. Welding may then proceed in either manual or automatic fashion, while adjusting material feed speed, wedge temperature, roller pressure and other welding parameters with the appropriate controls on control panel 30, as is known in the art, and while engaging or disengaging wedge 60, as necessary.

Figure 11:
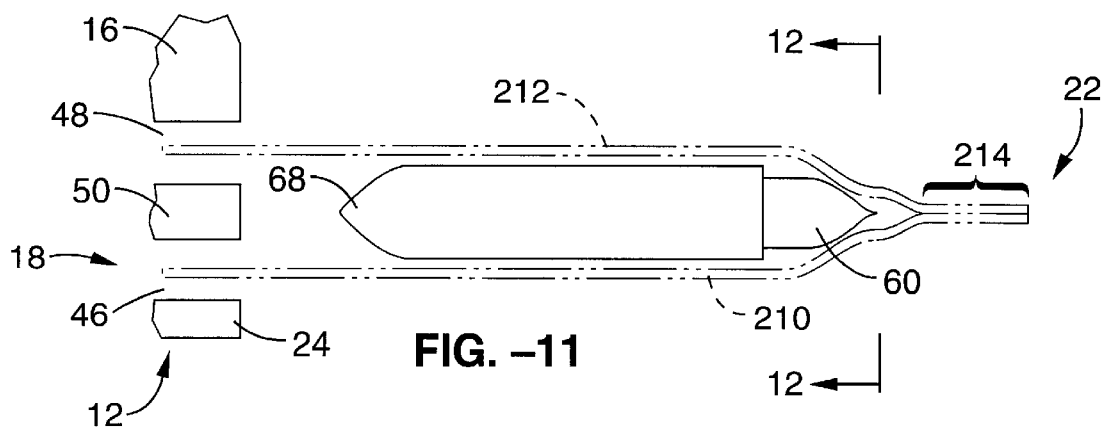
FIG. 11 is a schematic representation, from the right-hand side, of a longitudinal cross-section of a lap weld during its formation.
Figure 12:
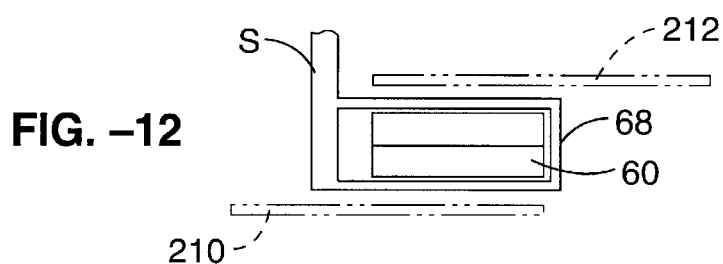
FIG. 12 is a transverse cross-sectional view from downstream, on lines 12—12, of formation of the lap weld of FIG. 11.
Figure 13:
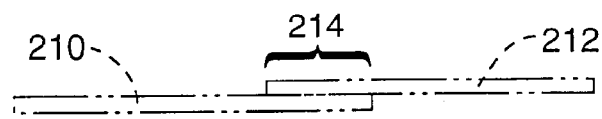
FIG. 13 is a schematic cross-section of a completed lap weld.

A schematic longitudinal cross-section of the afore-described lap weld during its formation is presented in FIG. 11; a corresponding transverse cross-sectional view from downstream is presented in FIG. 12; and, a schematic cross-section of the completed lap weld 214 is shown in FIG. 13. The conventions of using "S" to identify a schematic representation of a combined support for the wedge and shrouds, and a bracket to identify a welded area, are employed throughout the drawing figures.

Figure 14:
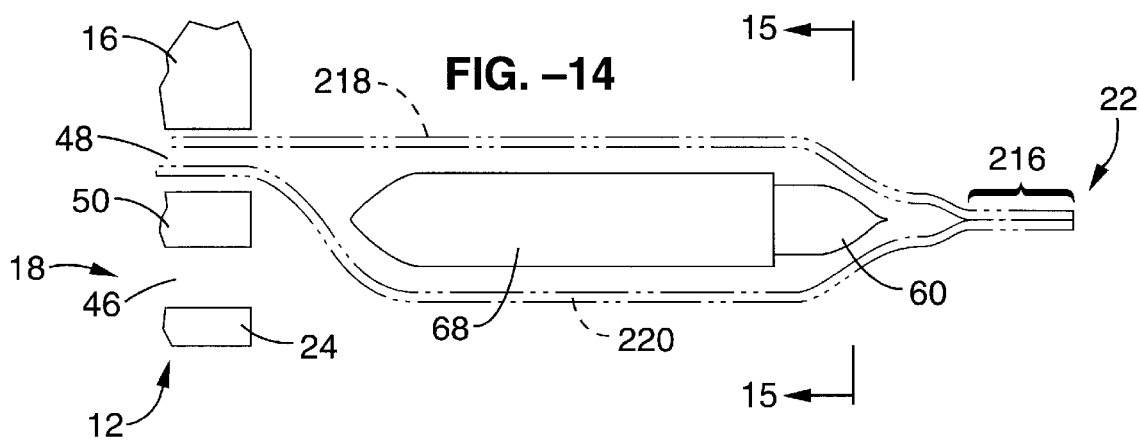
FIG. 14 is a schematic representation, from the right-hand side, of a longitudinal cross-section of a fin weld during its formation.
Figure 15:
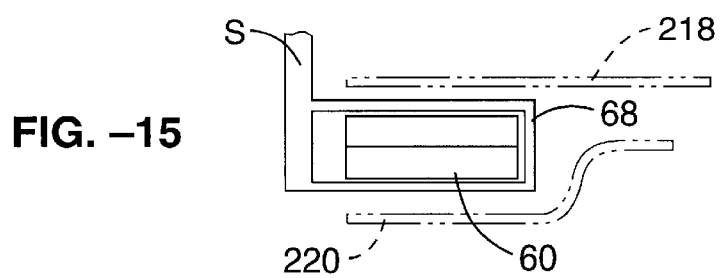
FIG. 15 is a transverse cross-sectional view from downstream, on lines 15—15, of formation of the fin weld of FIG. 14.
Figure 16:
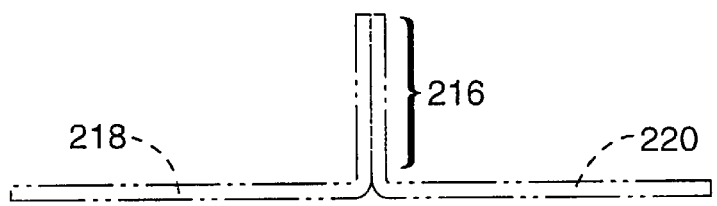
FIG. 16 is a schematic cross-section of a completed fin weld.

FIGS. 14, 15 and 16, respectively, show a schematic longitudinal cross-section of, a transverse cross-section of, and a representation of a completed, fin weld 216. Welder 10 is prepared for performing a fin weld by first putting bottom right edge auxiliary guide 144 in place below horn 68. Fin weld 216 is then formed by feeding lower and upper sheets 218 and 220 together, and in stacked relation, into upper left infeed slot 48 with their right edges aligned with one another against left sliding infeed guide 54. Sheets 218 and 220 separate at the upstream end of horn 68, upper sheet 218 going above, lower sheet 220 going below. Lower sheet 218's right edge is against rightward travel-limiting wall 147 of bottom right edge auxiliary guide 144. Upper sheet 220's right edge is against top right edge auxiliary guide 128's rightward travel-limiting wall 133. Lower sheet 218 is threaded from below horn 68, across the lower face of wedge 60 and between rollers 72 and 74. Upper sheet 220 is threaded across the upper face of wedge 60 and is pressed down upon lower sheet 218 between rollers 72 and 74.

Figure 19:
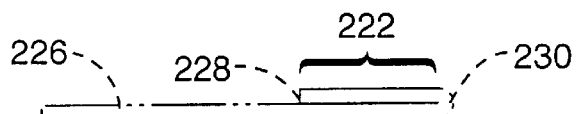
FIG. 19 is a schematic cross-section of a completed hem weld.
Figure 17:
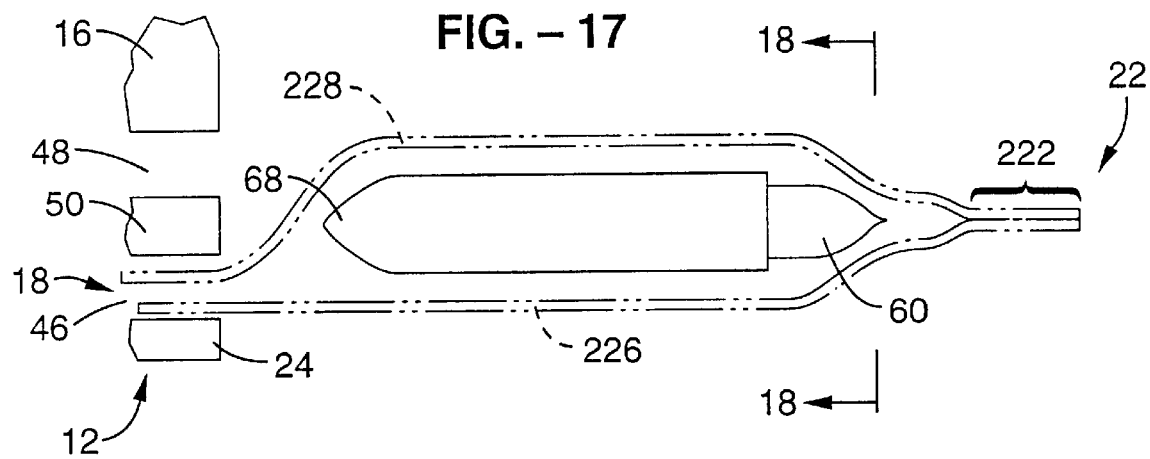
FIG. 17 is a schematic representation, from the right-hand side, of a longitudinal cross-section of a hem weld during its formation.
Figure 18:
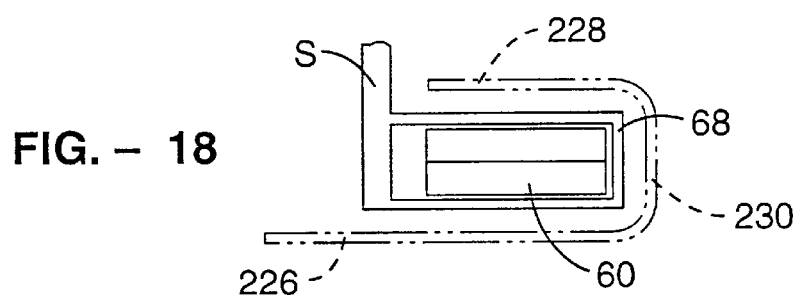
FIG. 18 is a transverse cross-sectional view from downstream, on lines 18—18, of formation of the hem weld of FIG. 17.

FIGS. 17, 18 and 19, respectively, show a schematic longitudinal cross-section of, a transverse cross-section of, and a representation of a completed, hem weld 222. Welder 10 is prepared for performing hem weld 222 by first sliding outer hem guide 158 onto top guide support rods 130 and outer hem guide control rod 156. Guide lock screw 58 above upstream transverse channel 162 in outer hem guide 158 may be used to bind outer hem guide 158 to control rod 156 at a fixed distance from horn width extender 148. Thereafter, horn width extender 148 and outer hem guide 158 move together as a unit, maintaining the space fixed therebetween, in response to movement of push/pull tab 154. The width of the hem is set by moving push/pull tab 154 leftward to position horn width extender 148 and outer hem guide 158 a desired distance from horn 68. This assembly may be locked in position with a guide lock screw (not shown) bearing on one of the horn width extender support rods 150 where they pass through horn 68 or skirt 152. Top right edge auxiliary guide 128 is set in its rightward-most position. No auxiliary guide is used beneath horn 68.

Hem weld 222 is then formed by folding an outer edge 224 of a single sheet of weldable material over on itself so that a primary sheet portion 226 and a hem portion 228 are thereby defined. This folded single sheet is then fed into lower right infeed slot 46 such that, as it progresses downstream, primary sheet portion 226 passes beneath horn 68, and hem portion 228 passes thereover. As is illustrated best in FIG. 17, primary sheet portion 226 curves up from beneath horn 68, and between horn width extender 148 and outer hem guide 158, such that upper hem portion 228 lies relatively flat atop horn 68 with outer edge 224 against top right edge auxiliary guide 128's rightward travel-limiting wall 133. Moving downstream, lower primary sheet portion 226 moves across the lower face of hot wedge 60 and between rollers 72 and 74. Hem portion 228 moves across the upper face of wedge 60, and is pressed down on lower primary sheet 226 between rollers 72 and 74. As illustrated in FIG. 19, an nonwelded fabric portion 230 remains to the left of the welded portion of hem weld 222.

Figure 20:
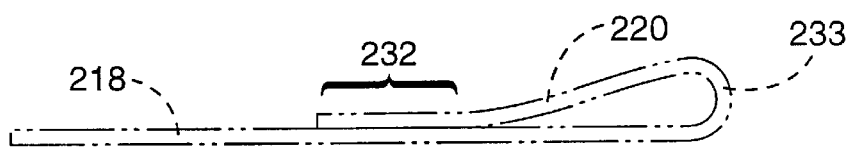
FIG. 20 is a schematic cross-section of a completed sleeve weld.

A variation on fin weld 216 is sleeve weld 232 shown in FIG. 20. Sleeve weld 232 is accomplished by simply folding a sheet of material such that lower sheet 218 and upper sheet 220 of fin weld 216 are simply opposed edges of the same sheet. This leaves a nonwelded loop portion 233.

Figure 21:
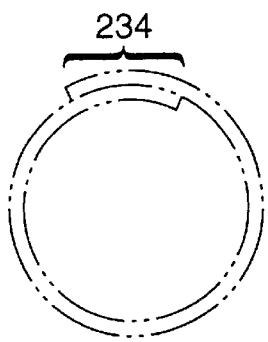
FIG. 21 is a schematic cross-section of a completed tube weld.
Figure 22:
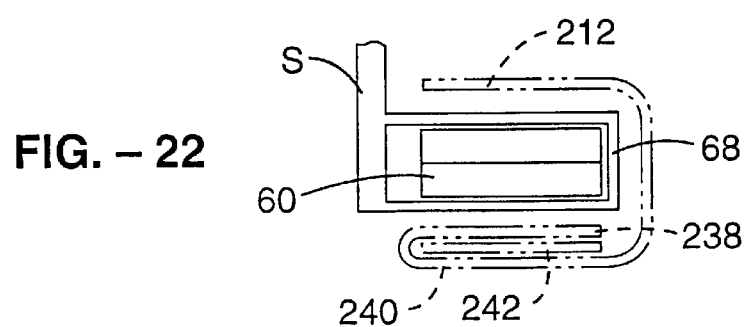
FIG. 22 is a transverse cross-sectional view, from downstream, of formation of a tube weld.

A variation on a lap weld 214 is tube weld 234 shown in FIG. 21. Tube weld 234 is achieved by eliminating the lower right sheet of lap weld 214, and by instead folding the fabric sheet 212 that is fed into upper left infeed slot 46 so that a doubled portion 236 thereof runs beneath horn 68 and wedge 60 as illustrated in FIG. 22. Sleeve 234 may be created without using any auxiliary guide beneath horn 68, and just using left slot sliding infeed guide 54 to align doubled portion 236. However, the preferred approach is to employ a modified version of bottom right edge auxiliary guide 144 with a notch 146 in its underface able to accommodate the thickness of doubled sheet portion 236. Control of the temperature of hot wedge 60 is more sensitive in creating sleeve weld 234, because welding the upper and lower segments 238 and 240 of doubled portion 236 beneath wedge 60 to one another is to be avoided. A later-removable strip of insulating material 242 may be used between upper and lower segments 238 and 240 to reduce this likelihood.

Figure 23:
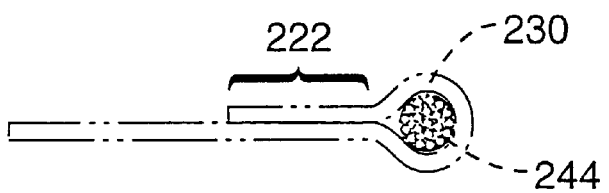
FIG. 23 is a schematic cross-section of a completed hem weld with a chain, rope or cable in the channel running therethrough.

As shown in FIG. 23, a variation on hem weld 222 includes a thick tether such as chain, rope or cable 244 running through the length of the hem's interior. This requires accommodation of increased cross-sectional thickness where the hem's channel passes through welder 10. Such is provided by chain channel 168 in base plate 24, in the leftward-most half of lower right infeed slot 46.

Figure 24:
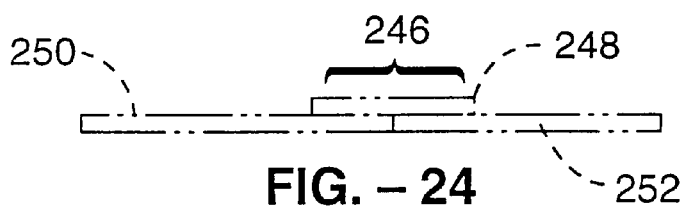
FIG. 24 is a schematic cross-section of a completed taped butt weld.

Taped butt welds 246 are a variation of lap weld 214. As shown in FIG. 24, a narrow tape strip 248 of weldable material is welded to the upper surfaces of abutting right and left sheets 250 and 252, thereby binding them together. This is accomplished by feeding right sheet 250 into lower right infeed slot 46 and left sheet 252 into upper left infeed slot 48, and by passing both sheets 250 and 252 beneath horn 68. No auxiliary guide is used beneath horn 68; the opposed edges of the sheets are simply abutted together. The left edge of right sheet 250 is against right sliding infeed guide 52, but the right edge of left sheet 252 is set back from left sliding guide 54 a distance half the width of the tape strip 248. Although left sheet 252 does not contact any guide directly, the left edge of right sheet 250 serves as the guide for the right edge of left sheet 252. Tape strip 248 is fed in through upper left infeed slot 46 atop left sheet 252. Tape strip 248's right edge is against left sliding infeed guide 54 and top right edge auxiliary guide 128's rightward travel-limiting wall 133. Tape strip 248 passes across the upper face of hot wedge 60 and is pressed down between rollers 72 and 74 over the abutting opposed edges of right and left sheets 250 and 252.

Figure 25:
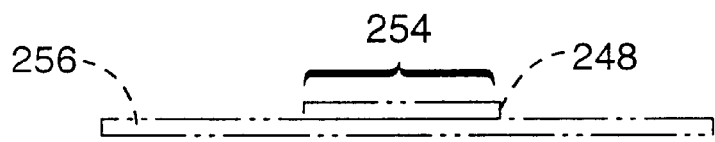
FIG. 25 is a schematic cross-section of a completed taped reinforcement weld.

Taped reinforcements 254 employ a tape strip 248 similar to that employed in constructing taped butt weld 246. However, as shown in FIG. 25, reinforcements 254 are simply doubled layers of material. Taped reinforcements 254 are useful, for example, where grommets will be installed, or in areas where a unusual amount of wear is expected. Several alternative procedures may be used for creating a taped reinforcement 254. For example, tape strip 248 may be fed into upper left infeed slot 48, while the sheet 256 to which tape 248 is bound is folded double and may be fed into either lower right slot 46 and passed below horn 68 and wedge 60, or sheet 256's double layers may be fed through upper left slot beneath tape strip 248 and passed below horn and wedge 68 and 60.

Figure 26:
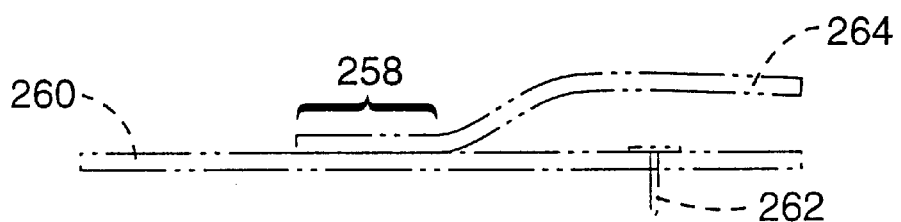
FIG. 26 is a schematic cross-section of a completed flap weld.

Flap weld 258, used in sloped roofing applications, and the like, wherein an under-flap portion of the sheet material 260 is fastened to an underlying surface with nails 262, is illustrated in FIG. 26. The alternative construction procedures for forming flap weld 258 are similar to those described above regarding taped reinforcement 254, except, as shown in FIG. 26, a flap strip of material 264 wider than tape strip 248 is used, and a substantial portion of flap strip 264 remains free and nonwelded to the underlying sheet 260.

Figure 27:
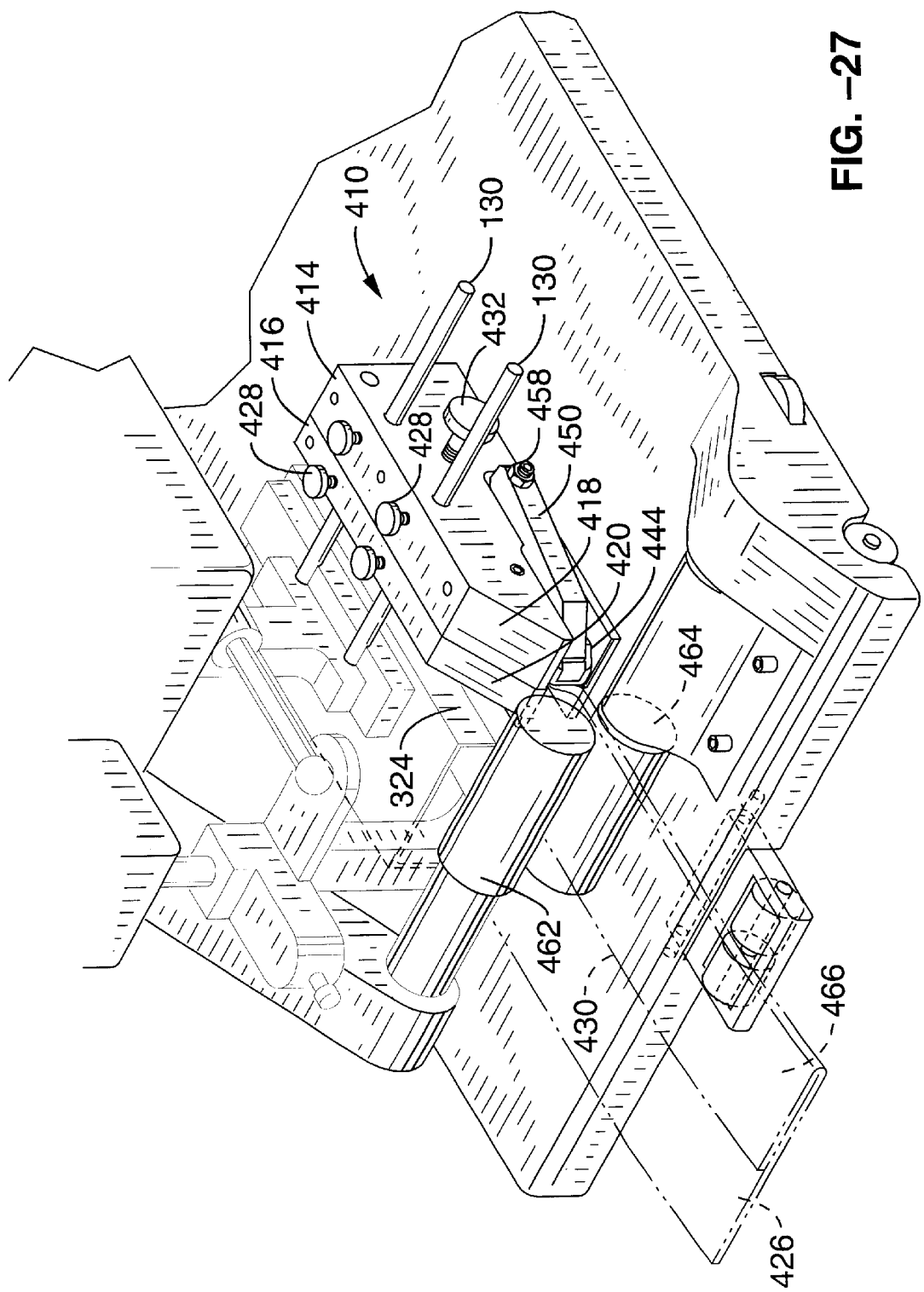
FIG. 27 is a perspective view of an alternative flat hem weld apparatus in place on a welder.
Figure 28:
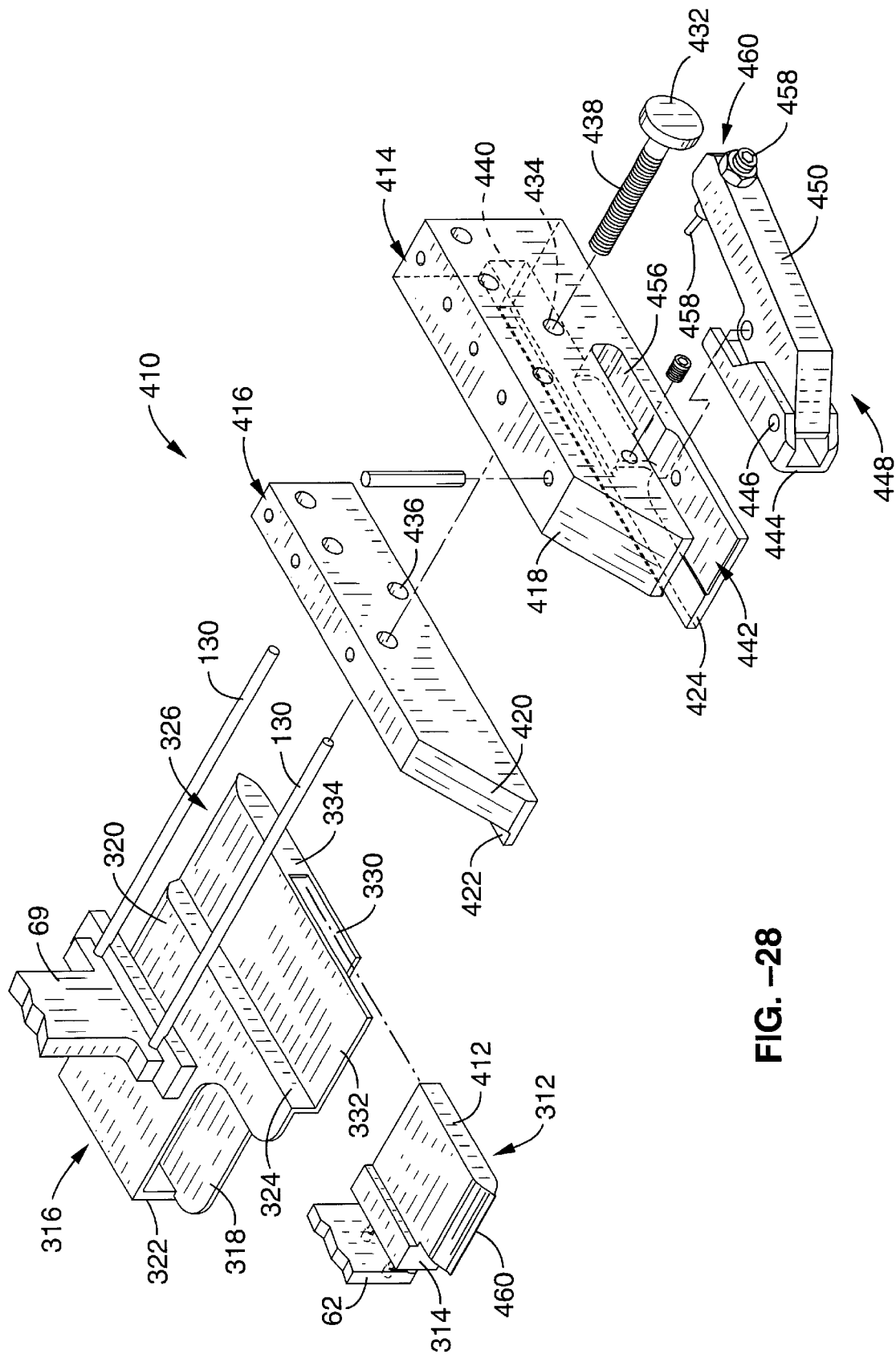
FIG. 28 is an exploded perspective view of the alternative flat hem weld production apparatus.
Figure 29:
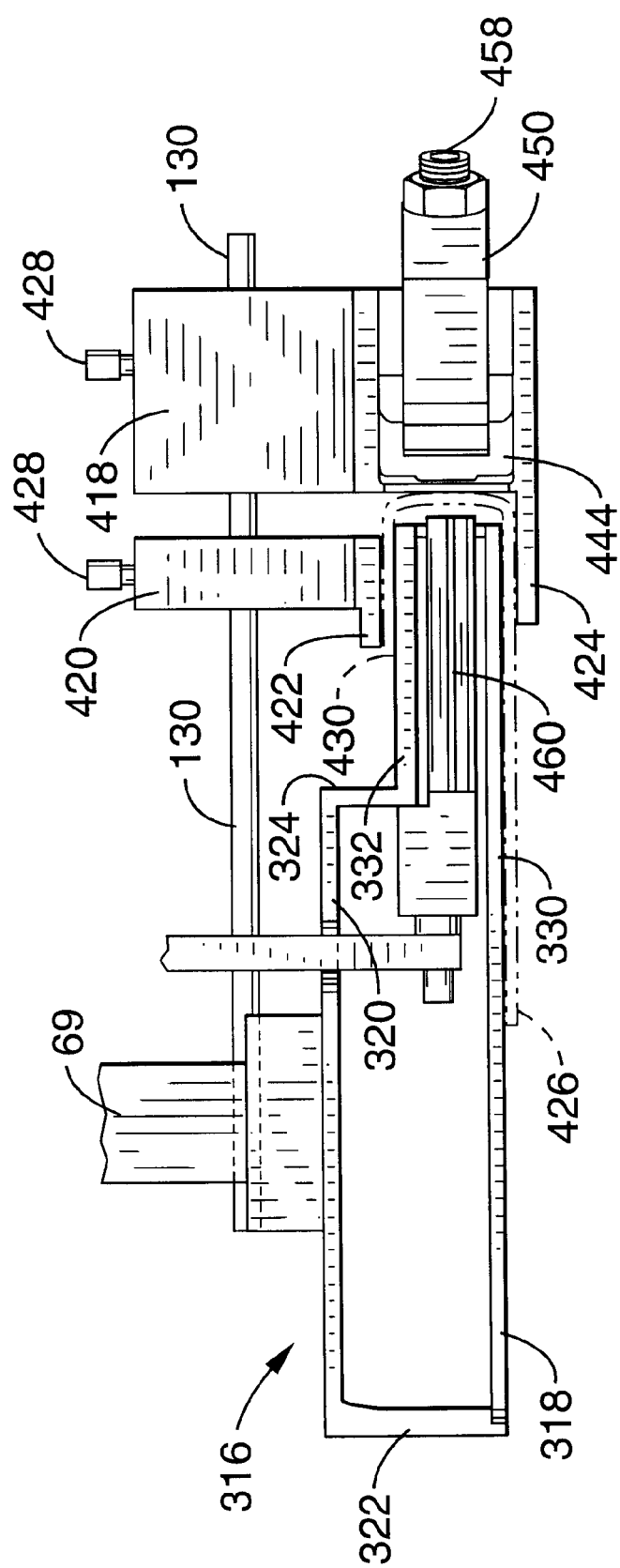
FIG. 29 is an elevational view, looking upstream, of the alternative flat hem apparatus of FIG. 27.

As shown in FIGS. 27, 28 and 29, alternative flat hem production apparatus 410 selectively replaces hot wedge 60, horn 68 and hot wedge parking shroud 70. And, when flat hem production apparatus 410 is in place, top right edge auxiliary guide 128, bottom left edge auxiliary guide 134, removable tab 140, horn width extender 148 and its associated support rods 150, push/pull tab 154, outer hem guide control rod 154, and outer hem guide 158 are not used. As further described below, the elements of which flat hem production apparatus 410 is comprised are mounted on vertical shaft 62, shroud support leg 69 and top guide support rods 130.

The right and left directional orientations established above with respect to right and left slots 46 and 48 are continued here. That is, right and left are determined from an upstream position, looking in a downstream direction.

Flat hem production apparatus 410 includes alternative thin hot wedge 312 mounted on extension block 314 which is, in turn, mounted to vertical shaft 62, vertical shaft 62 being as hereinabove described. That is, as wedge engaging handle 66 swings through a horizontal arc, thin hot wedge 312 does the same at shaft 62's lower end.

Alternative thin hot wedge 312 is thinner than hot wedge 60, i.e. it has less vertical height; and, although the left face of thin hot wedge 312 resides in alignment with left-hand faces 86 and 88 of rollers 72 and 74, respectively, just as the left face of hot wedge 60 did, thin hot wedge 312 is narrower in a left-to-right direction than hot wedge 60, as well. Thin hot wedge 312 is preferably about half the width of hot wedge 60. Thus, extension block 314 occupies a space between vertical shaft 62 and thin hot wedge 312 that was occupied by, roughly, the right-hand half of hot wedge 60. Reasons for these reduced dimensions of thin hot wedge 312 will become apparent below.

Flat hem production apparatus 410's parking shroud portion 316 is formed with an interior portion of sufficient dimension to house and protect thin hot wedge 312 and extension block 314 as wedge engaging handle 66 is operated to swing thin hot wedge 312 away from the nip of rollers 72 and 74. Parking shroud portion 316 is suspended from the lower end of shroud support leg 69. Parking shroud 316 includes a lower wall 318, an upper wall 320, a right-side wall 322 and a left-side panel 324.

The left-hand side of flat hem production apparatus 410 includes thin horn 326. Thin horn 326 projects from the left-hand side of parking shroud 316. Similar to horn 60, thin horn 318 covers the upstream end of thin hot wedge 312. Thin horn 318 has a generally wedge-shaped upstream end 328 with its apex oriented in an upstream direction. Horizontal bottom wall 330 of thin horn 326 is contiguous with parking shroud 316's lower wall 318. Horizontal top wall 332 of thin horn 326 is suspended at a height lower than that of parking shroud 316's upper wall 320. Vertical left-side panel 324 of parking shroud 316 connects thin horn 326's top wall 332 with parking shroud 316's upper wall 320, and is generally perpendicular to both. Web 334 comprises a vertical wall between the left-most edges of thin horn 326's bottom and top walls 330 and 332. Web 334 does not extend downstream as far as either bottom wall 330 or top wall 332 of thin horn 326. This leaves thin hot wedge 312's left side face 412 exposed on the left side of thin horn 326.

The left-hand side of parking shroud 316's upper wall 320, parking shroud 316's left-side panel 324, and thin horn 326's top wall 332, all project a bit farther downstream than the rest of parking shroud 316 to cover and protect thin hot wedge 312 when it is in place and at working temperature adjacent the nip of rollers 72 and 74.

Outer flat hem guide 414 and anti-curl guide 416 are supported on top guide support rods 130. Rods 130 remain in place projecting horizontally from the left side of the lower end of shroud support leg 69.

Outer flat hem guide 414 is an elongate, generally rectangular block, oriented parallel with welder 10's upstream/downstream axis. Outer hem guide 414 has a beveled, downstream, upper corner 418 adapted to limit obstruction of the nip area of the rollers.

Anti-curl guide 416 is also an elongate, generally rectangular block oriented parallel with welder 10's upstream/downstream axis. It has upper and lower faces (unnumbered) which are substantially identical in upstream-downstream length to those of outer flat hem guide 414. However, as can be seen in FIG. 29 anti-curl guide 416 is somewhat thinner than outer flat hem guide 414, and the height of its upstream and downstream faces (unnumbered) is less than those of outer flat hem guide, as well. Like outer flat hem guide 414, anti-curl guide 416 has a beveled, downstream, upper corner 420 to prevent obstruction of the nip area of the rollers.

The lower, right corner of anti-curl guide 416 has a short panel 422 projecting rightwardly and horizontally therefrom. This is best seen looking from a downstream to upstream perspective, as in FIG. 29.

The lower, right corner of outer flat hem guide 414 also has a panel projecting rightwardly and horizontally therefrom, this being identified with reference numeral 424 and projecting somewhat farther from outer flat hem guide 414 than short panel 422 projects from anti-curl guide 416. Outer flat hem guide 414's projecting panel 424 is lower than and parallel to anti-curl guide 416's short upper panel 422. However, the respective lengths of upper and lower guide panels 422 and 424 are such that, when anti-curl guide 416 is nested closely against outer flat hem guide 414 on guide support rods 130, panels 422 and 424 project approximately the same distance in a rightward direction.

The vertical distance between upper and lower guide panels 422 and 424 must be sufficient to allow leftward-projecting thin hot wedge 312 and thin horn 326 to nest therebetween while a sheet of weldable material 426 is wrapped over the upper and lower faces of thin horn 326. This is best shown in FIG. 29

Outer flat hem guide 414 and anti-curl guide 416 are each slidable left and right on support rods 130, and each can be locked in any desired location therealong with two vertical thumb screws 428. Guides 414 and 416 may be spaced apart, as needed, to keep free edge 430 of material sheet 426 flat atop top wall 332 of thin horn 326 while material sheet 426 is being hemmed. Large, horizontal thumb screw 432 passes through threaded aperture 434 in outer flat hem guide 414 and is received by nonthreaded horizontal aperture 436 in anti-curl guide 416. Threaded aperture 434 and nonthreaded aperture 436 align with one another when guides 414 and 416 are mounted on rods 130. Distal, rightward-most end 438 of horizontal thumb screw 432 projects beyond the right face of anti-curl guide 416 and abuts parking shroud 316's left side panel 324. Once thumb screw 432 is set in a position which places outer flat hem guide 414 where desired, vertical thumb screws 428 of guide 414 may be loosened and guide 414 may be withdrawn leftwardly from rods 130, as is necessary when loading a new sheet of weldable material 426 and wrapping it around thin horn 326. Then, once welder 10 is reloaded, outer flat hem guide 414 may be slipped onto rods 130 to the position where distal end 438 of horizontal thumb screw 432 again abuts parking shroud 316's left side panel 324, and guide 414 will be in the same position as before it was withdrawn. During such reloading, it is helpful to keep anti-curl guide 416 in place, as it holds free edge 430 of weldable material sheet 426 in place during reloading. However, if desired, anti-curl guide 416 may be moved, as well, after simply loosening its vertical thumb screws 428.

Alternatively, to facilitate changing material 428 or reloading, means such as set screws (not shown) may be provided for release of the rightward-most ends of top guide support rods 130. That way, outer flat hem guide 414 and anti-curl guide 416 may remain in their fixed positions on rods 130, and horizontal thumb screw 432 may remain in position, as well, while material 428 is changed or reloaded.

Outer flat hem guide 414 includes longitudinal channel 440 in its right face which serves to deepen the leftward recess between upper and lower guide panels 422 and 424. Channel 440 runs the entirety of the upstream-downstream length of outer flat hem guide 414 and has a height equal to the vertical distance between upper and lower guide panels 422 and 424.

Figure 30:
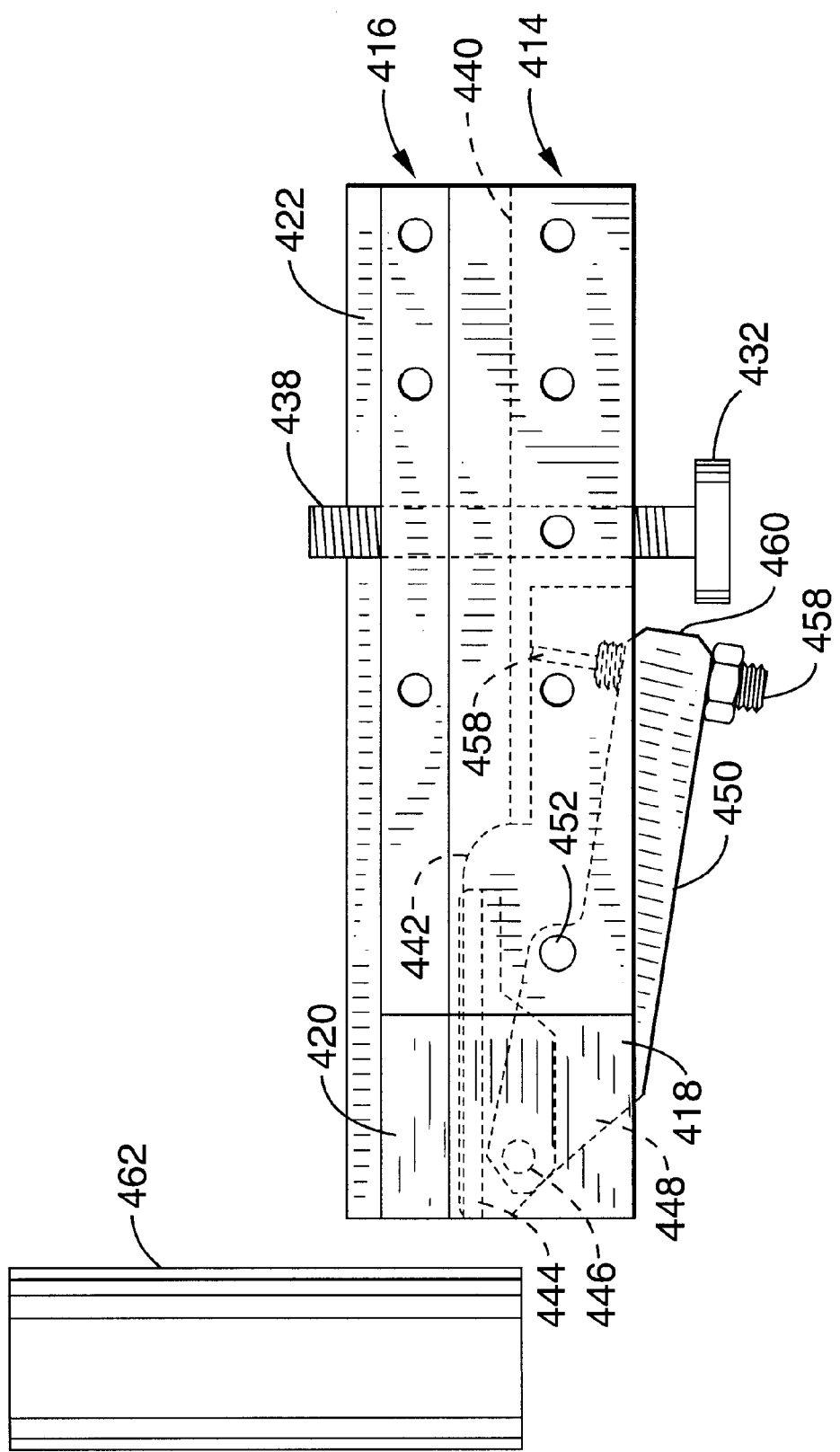
FIG. 30 is a top plan view of the flat hem apparatus with its shoe biased into its rightward-most position.
Figure 31:
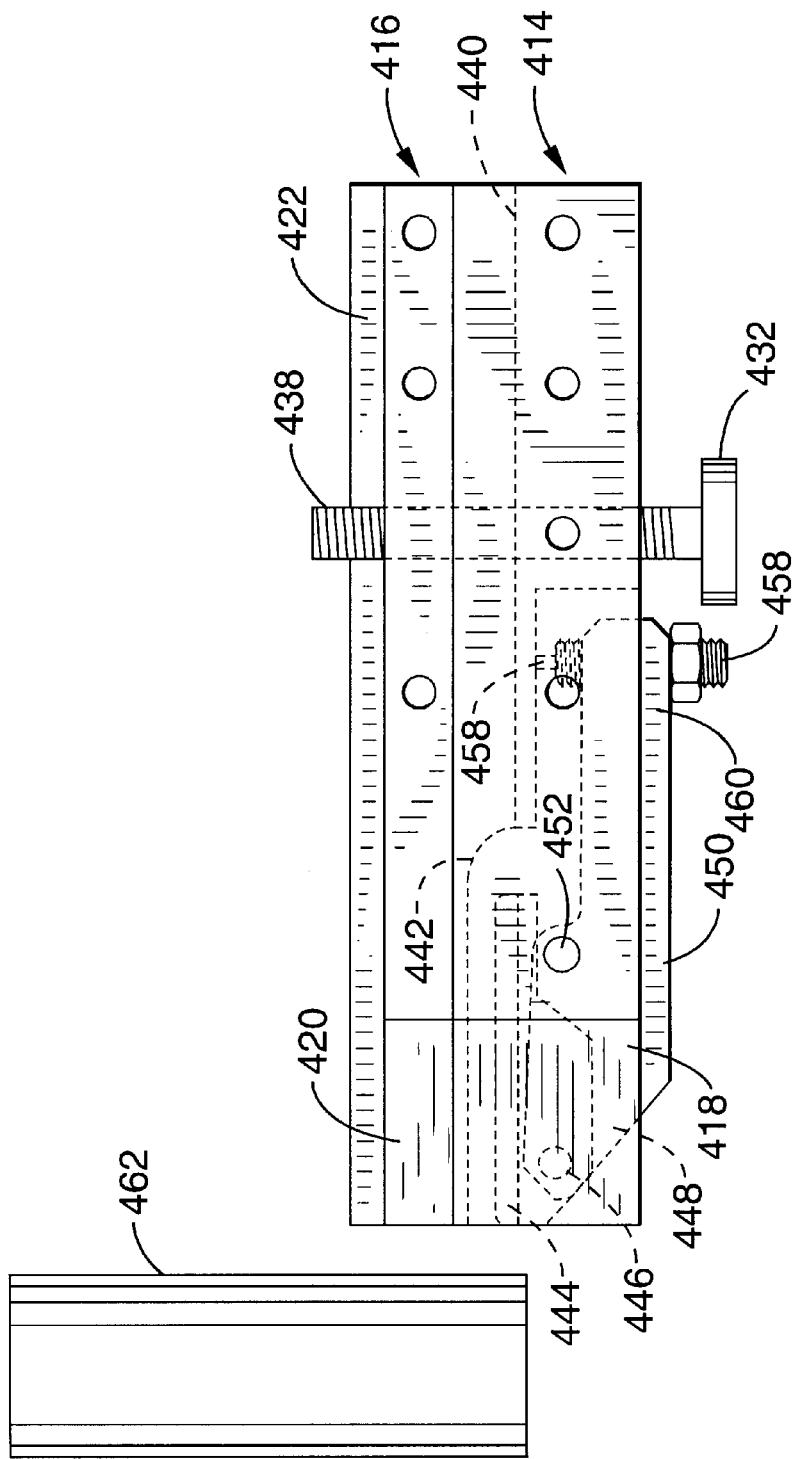
FIG. 31 is a top plan view of the flat hem apparatus with its shoe shifted leftward away from the upstream-downstream longitudinal axis, as occurs when a seam passes the shoe.

A downstream portion of outer flat hem guide 414 is cut away, through channel 440, forming a generally horizontal slot 442 which permits pivoting shoe 444 to project rightwardly therethrough. Shoe 444 is mounted on vertical pivot pin 446 at the downstream end 448 of pressure arm 450. Pressure arm 450, in turn, pivots on vertical pivot post 452 secured in the body of outer flat hem guide 414. Upstream end 454 of pressure arm 450 nests in recess 456 contiguous with slot 442 in outer flat hem guide 414. Upstream end 454 of pressure arm 450 includes spring pin mechanism 458 which biases upstream arm end 454 away from nesting in recess 456. Thus, as shoe 444 is driven in a leftward direction, upstream arm end 454 is driven, against back pressure from spring pin 458, into recess 456. This is best shown in FIGS. 30 and 31. This might occur, for example, when a transverse seam tying lengths of weldable sheet material to one another passes downstream through welder 10. At that point, a greater gap would be needed between the left side face 412 of wedge 312 and the right face of outer flat hem guide 414. Although the relief provided by channel 440 might provide enough clearance to accommodate such a passing transverse seam, and although the seam area, being thicker than the rest of the weldable material, would press against left face 412 of wedge 312 for adequate heating, single-ply material passing wedge 312 might not be adequately heated in the absence of shoe 444. Thus, this construction, including shoe 444, assures that as weldable sheet material 426 passes the exposed, left side face 412 of thin hot wedge 312, it is actively pressed against that exposed, hot left face 412. And, as the rest of the adjacent material passing over the exposed, upper and lower faces of hot wedge 312 is equally heated, the entirety of the material passing hot wedge 312 is available to be pressed into a fully-bonded, gapless hem.

As sheet material 426 passes downstream from the tapered, downstream end 460 of thin hot wedge 312 it passes into alternative upper and lower rollers 462 and 464. Rollers 462 and 464 are longer than 72 and 74. This extra length is necessary to place the left hand ends of alternative rollers 462 and 464 well to the left of the plane of the right wall of outer flat hem guide 414, because as that portion of weldable material 426 which passes and gets heated by left face 412 of hot wedge 312 passes into rollers 462 and 464, a creased fold is formed which maximizes the final flat width of the fully-bonded, gapless hem 466.

The foregoing detailed disclosure of the inventive welder 10 is considered as only illustrative of the preferred embodiment of, and not a limitation upon the scope of, the invention. Those skilled in the art will envision many other possible variations of the structure disclosed herein that nevertheless fall within the scope of the following claims. For example, a welder including opposing infeed slots arranged in an S-shaped configuration, and a welding wedge suspended from one of its ends so neither the wedge, nor its suspension, obstruct the open side of either infeed slot, would fall within the claims. Thus, a welder with an S-shaped channel configured as disclosed herein could, alternatively, have its welding wedge suspended from the base plate on the lower left, as long as the wedge and suspension were contiguous with the lower left base plate and not crossing over and/or obstructing the path of material feed through the welder. Conversely, a welder having the opposite S-shaped channel configuration, i.e. with lower left and upper right infeed slots, could have its wedge suspended from and contiguous with either the upper portion of the chassis (e.g. the motor housing or support arm) on the left side, or the lower portion of the chassis (e.g. the base plate) on the right, because neither of these suspension orientations would obstruct the open ends of the infeed slots. Thus, several different arrangements of the essential elements of the invention are possible without departing from the claims, and 90°-rotated versions of each are possible, as well. Pressure rollers on such welders may be oriented either horizontally or vertically, and may be operable such that either roller moves vertically with respect to the other, or such that either roller moves to and fro, i.e. side-to-side, with respect to the other. And, as those skilled in the sheet material welding art will comprehend, guides for any of the foregoing contemplated welder configurations would be of constructions analogous to those disclosed herein, but would be disposed and oriented appropriately to achieve the welds described. Thus, 180°-rotated and mirror-image variations on the inventive welder are contemplated herein, as are 90°-rotated versions, and all are considered to fall within the claims.

And, alternative uses for this inventive welder may later be realized. For example, with the appropriate adjustments of temperature and other welding conditions, materials other than plastic sheeting, such as metallic compositions, and the like, may be welded in the manner described. And, the welding head employed may be an element other than a hot wedge if sheets of material other than weldable plastics will be bound to one another. For example, sheets of any composition able to be adhesively bound to one another could be so bound by a welder including a welding head which expresses an appropriate adhesive. In that case, the auxiliary guides and other mechanical elements described herein would function similarly but, in an adhesive-based welder, adhesive control apparatus would replace the heat delivery and control apparatus described herein. One variation thereupon is adhesive control apparatus for a two-part, resin and catalyst system, wherein resin is expressed from one side of the welding wedge and catalyst is expressed from the other.

Accordingly, the scope of the invention should be determined with reference to the appended claims, and not by the examples which have herein been given.

What is claimed is:

1. Apparatus for forming a flat hem in weldable sheet material, comprising:
   a. a hot wedge;
   b. means for moving weldable sheet material from upstream to downstream, past said hot wedge, such that said material is heated by said hot wedge;
   c. means wider than said hot wedge for forming a creased, upstream to downstream, fold in a portion of said sheet material after said portion of said sheet material has been heated by passage over said hot wedge; and,
   d. means for pressing together heated portions of said weldable sheet material directly adjacent said creased fold, such that a gapless hem results.

2. The apparatus of claim 1, wherein said means for forming a gapless hem comprises:
   a. means for moving said weldable sheet material over said hot wedge such that a portion of said sheet material passes over an upper face of said hot wedge, such that a portion of said sheet material passes over a lower face of said hot wedge, and such that a portion of said sheet material passes over a side face of said hot wedge;
   b. means for pressing that portion of said weldable sheet material which passed over said hot wedge's upper face into contact with that portion of said weldable sheet material which passed over said hot wedge's lower face; and,
   c. means for pressing an upper half of that portion of said weldable sheet material which passed over said hot wedge's side face into contact with a lower half of that portion of said weldable sheet material which passed over said hot wedge's side face.

3. The apparatus of claim 2, further including means for forming a creased fold between said upper half of that portion of said weldable sheet material which passed over said hot wedge's side face and said lower half of that portion of said weldable sheet material which passed over said hot wedge's side face.

4. The apparatus of claim 3, wherein said creased fold forming means comprises opposed cylindrical rollers oriented transverse to said upstream to downstream direction of travel of said weldable sheet material.

5. The apparatus of claim 4, wherein the length of each said roller along its longitudinal axis is at least the sum of the width across said hot wedge, transverse to said upstream to downstream direction of travel of said weldable sheet material, plus half the thickness of said hot wedge.

6. Apparatus for forming a flat hem in weldable sheet material, comprising:
   a. a hot wedge;
   b. means for moving weldable sheet material from upstream to downstream, past said hot wedge;
   c. a horn upstream from said hot wedge, wherein said horn covers an upstream end, top and bottom faces, and a first side face of said hot wedge, yet leaves a second side face and a tapered downstream face of said hot wedge exposed;
   d. means parallel to, and a short distance below, a bottom face of said horn for guiding weldable sheet material over said bottom face of said horn;

e. means parallel to, and a short distance above, a top face of said horn for guiding weldable sheet material over said top face of said horn;

f. spring-biased means adjacent said exposed side face of said hot wedge for pressing weldable sheet material against said exposed side face of said hot wedge; and, e. means downstream from said hot wedge for pressing surfaces of a piece of weldable sheet material traveling over an upper portion of said hot wedge's tapered downstream face and an upper portion of said hot wedge's exposed side face into contact with adjacent surfaces of said same piece of weldable sheet material traveling over a lower portion of said hot wedge's tapered downstream face and a lower portion of said hot wedge's exposed side face, whereby a hem is formed in said weldable sheet material, said hem having no nonwelded gap therein.

7. The apparatus of claim 6, wherein said pressing means comprises opposed cylindrical rollers oriented transverse to said upstream to downstream direction of travel of said weldable sheet material.

8. The apparatus of claim 6, wherein the length of each said roller is at least the sum of the width across said hot wedge, transverse to said upstream to downstream direction of travel of said weldable sheet material, plus half the thickness of said hot wedge.

9. The apparatus of claim 6, wherein first ends of said rollers are substantially aligned, upon a longitudinal upstream to downstream axis, with said first, covered side face of said hot wedge, and wherein second ends of said rollers project substantially beyond said second, exposed side face of said hot wedge, thereby permitting portions of said rollers which project substantially beyond said second, exposed side face of said hot wedge to crease and fold longitudinally, and to press together, that portion of weldable sheet material which travels over said second, exposed side face of said hot wedge.

10. The apparatus of claim 6, wherein said rollers are of sufficient length and so positioned as to press the entirety of a portion of said weldable sheet material traveling over an upper portion of said hot wedge's second, exposed side face into contact with the entirety of a portion of said weldable sheet material traveling over a lower portion of said hot wedge's second, exposed side face.

11. The apparatus of claim 10, wherein said rollers form a creased fold between said portion of said weldable sheet material traveling over said upper portion of said hot wedge's second, exposed side face and said portion of said weldable sheet material traveling over said lower portion of said hot wedge's second, exposed side face.

* * * * *